(12) United States Patent
Fenney et al.

(10) Patent No.: US 7,227,546 B2
(45) Date of Patent: Jun. 5, 2007

(54) INTERFACE AND METHOD OF INTERFACING BETWEEN A PARAMETRIC MODELLING UNIT AND A POLYGON BASED RENDERING SYSTEM

(75) Inventors: Simon Fenney, Herts (GB); Jonathan Mark Redshaw, Herts (GB); John Russell, Herts (GB); Clifford Gibson, Herts (GB)

(73) Assignee: Imagination Technologies Limited, Hertfordshire (GB)

( * ) Notice: Subject to any disclaimer, the term of this patent is extended or adjusted under 35 U.S.C. 154(b) by 0 days.

(21) Appl. No.: 11/232,760

(22) Filed: Sep. 22, 2005

(65) Prior Publication Data

US 2006/0050071 A1 Mar. 9, 2006

Related U.S. Application Data

(62) Division of application No. 10/435,759, filed on May 9, 2003.

(30) Foreign Application Priority Data

May 10, 2002 (GB) ................................. 0210769.6

(51) Int. Cl.
*G06T 17/00* (2006.01)
(52) U.S. Cl. ..................................................... 345/423
(58) Field of Classification Search ..................... None
See application file for complete search history.

(56) References Cited

U.S. PATENT DOCUMENTS 5,428,718 A 6/1995 Peterson et al.
5,579,464 A * 11/1996 Saito et al. .................. 345/441
5,828,467 A * 10/1998 Suzuki ........................ 382/268
6,078,331 A 6/2000 Pulli et al.
6,100,894 A 8/2000 Goel
6,211,883 B1 * 4/2001 Goel ........................... 345/423
6,563,501 B2 * 5/2003 Sfarti .......................... 345/442
6,707,452 B1 * 3/2004 Veach ......................... 345/423
2001/0013866 A1 * 8/2001 Migdal et al. ............... 345/423

OTHER PUBLICATIONS

Search Report dated Nov. 8, 2002 in United Kingdom Application No. 0210769.6 (1 page).

(Continued)

*Primary Examiner*—Mark Zimmerman
*Assistant Examiner*—Andrew Yang
(74) *Attorney, Agent, or Firm*—Flynn, Thiel, Boutell & Tanis, P.C.

(57) ABSTRACT

An interface for use in a 3-d graphics system comprising a parametric modelling unit for modelling objects as high order surfaces, and a polygon based rendering system for rendering polygon modelled objects for display. The interface comprises an input for receiving data and a subdivision unit coupled to the input for processing the data. The interface includes a converter coupled to the subdivision unit for determining from leaf patch data a first plurality of values representing vertices of tessellating polygons describing the leaf patch, and for determining from sub-leaf patch data a second plurality of values representing the vertices of tessellating polygons describing the sub-leaf patch. The interface also has a combiner, coupled to the converter, for combining the values to form leaf polygon data defining the polygon vertices at a first subdivision level, and an output coupled to the combiner for outputting the leaf polygon data.

19 Claims, 17 Drawing Sheets

OTHER PUBLICATIONS

International Search Report mailed Dec. 17, 2004 in PCT International Application No. PCT/GB03/01966 (9 pages).

Chao, P. et al., "A VLSI Architecture for Bicubic Surface Patch Image Generation", *Conference Proceedings, Eighth Annual International Phoenix Conference on Computers and Communications, Proceedings of the IEEE Comput. Soc.*, U.S., Mar. 22, 1989, pp. 54-58.

Foley, vanDam, Feiner and Hughes, *Computer Graphics Principles and Practice*, 2d Edition, date unknown (title page and pp. 471, 476-481, 488-491, 500-502, 504, 507-509 and 516-528).

Watt, A. and Watt, M., *Advanced Animation and Rendering Techniques Theory and Practice*, Addison-Wesley, date unknown (title page and pp. 66-67).

Farin, *Curves and Surfaces for CAGD A Practical Guide*, 4th Edition, date unknown (title page and pp. 244-247).

Clark, J.H., "A Fast Algorithm for Rendering Parametric Surfaces", *Computer Graphics*, vol. 13, No. 2, date unknown (pp. 7-12).

\* cited by examiner

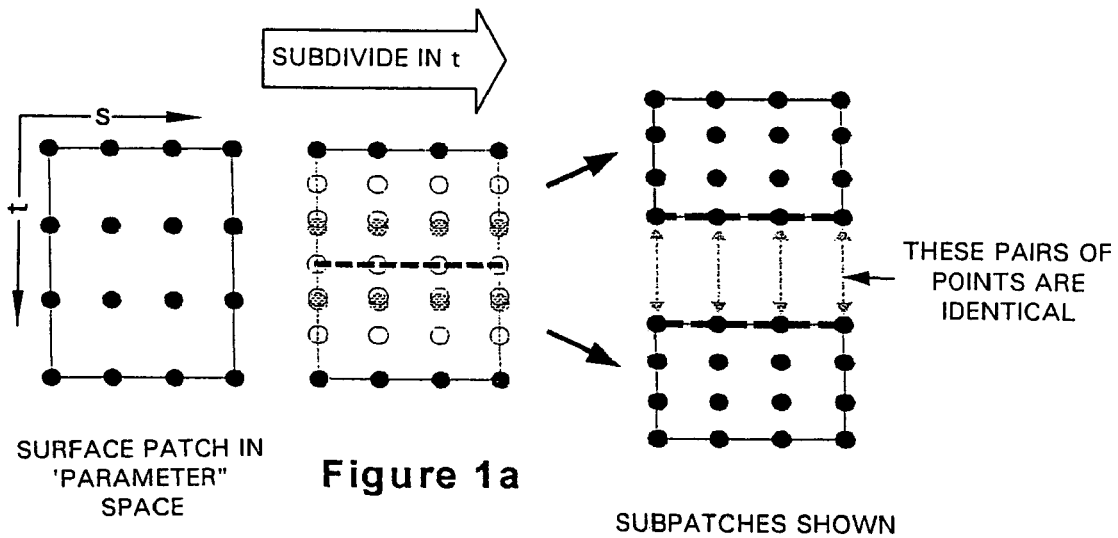
SURFACE PATCH IN 'PARAMETER' SPACE
Figure 1a
THESE PAIRS OF POINTS ARE IDENTICAL
SUBPATCHES SHOWN 'SEPARATED' PURELY FOR ILLUSTRATIVE PURPOSES
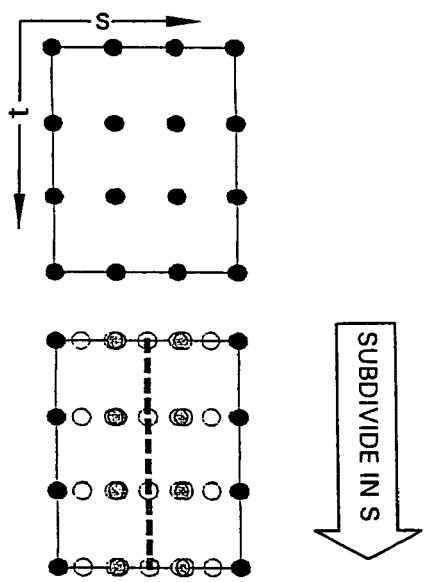
Figure 1b
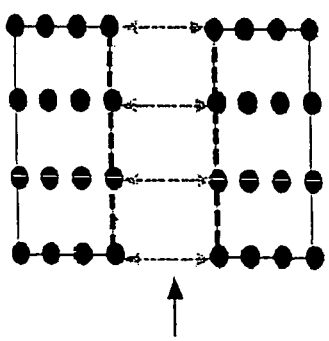
THESE PAIRS OF POINTS ARE IDENTICAL Regular Leaf Patch - preferred triangulation pattern Regular Leaf Patch - alternative triangulation pattern

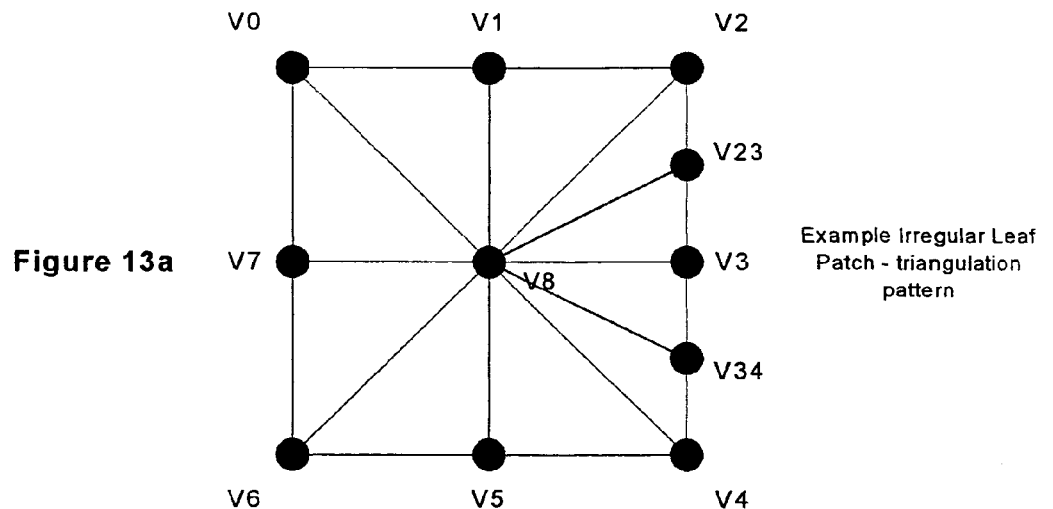
Figure 13a  Example Irregular Leaf Patch - triangulation pattern
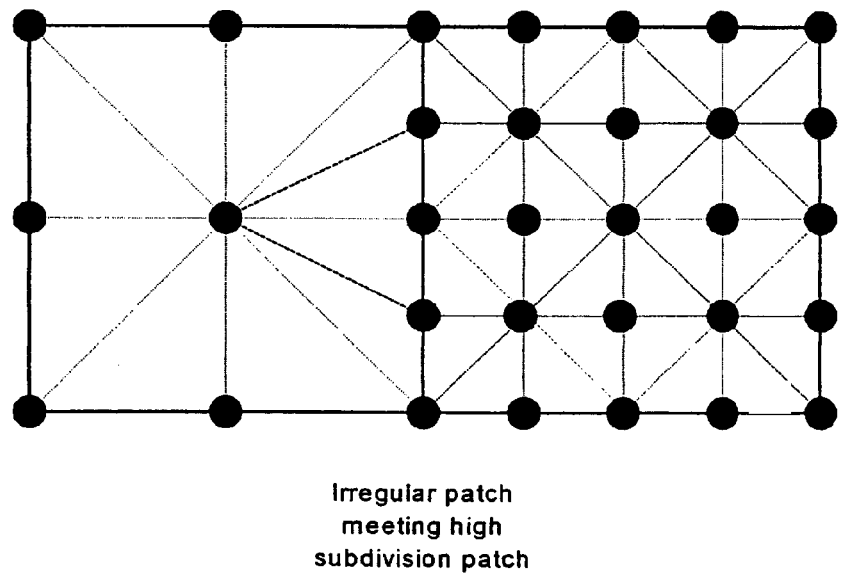
Figure 13b  Irregular patch meeting high subdivision patch

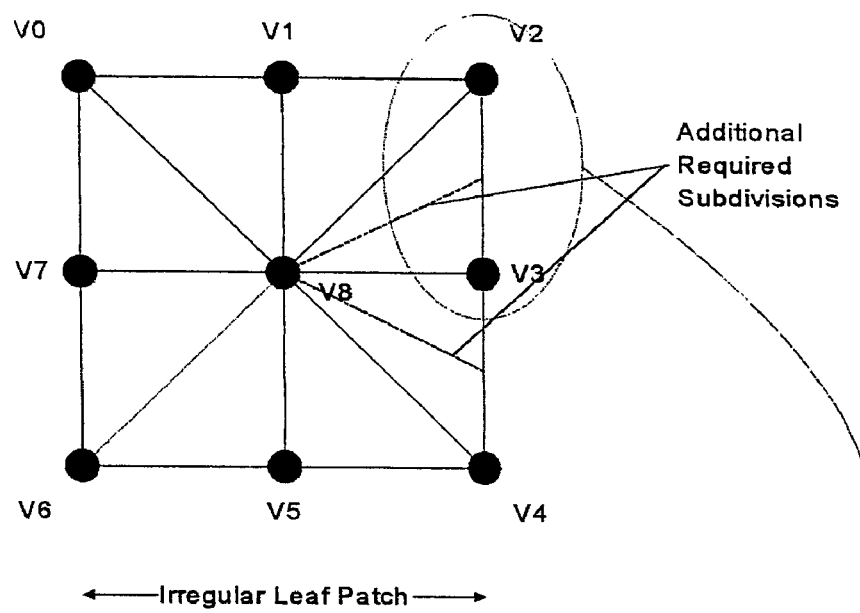
Figure 14
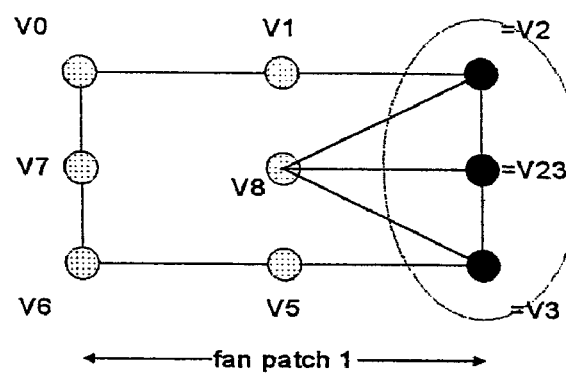
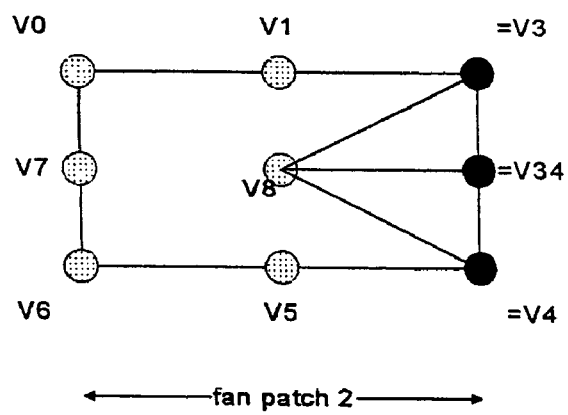

INTERFACE AND METHOD OF INTERFACING BETWEEN A PARAMETRIC MODELLING UNIT AND A POLYGON BASED RENDERING SYSTEM

This is a division of Ser. No. 10/435,759, filed May 9, 2003.

This invention relates to an interface for use in a 3-d graphics system comprising a parametric modelling unit and a polygon based rendering system.

BACKGROUND TO THE INVENTION

Traditional 3D rendering systems use a mesh of polygons (usually triangles) to model the objects within a scene. Triangles have the advantage that they are of a simple form, and it is therefore relatively easy to perform operations such as transformation, lighting, texturing and rasterization on them in order to produce an image for display.

A known alternative to modelling objects using a mesh of polygons is to segment the object into areas and fit a number of curved, high order surfaces, frequently termed patches, to the different areas of the object being modelled. These patches are generally defined as parametric surfaces with the surface shape governed by a grid of control points. An advantage of using high order surfaces is that the set of control points usually requires a much smaller amount of data to represent a particular model than the equivalent polygon mesh. High order surfaces are also generally easier to manipulate when animating an object which is changing in shape. A major disadvantage of modelling using high order surfaces is that it introduces added complexity in the rasterization stage of the rendering system.

It is also known to use high order surfaces for the modelling stage and to convert the surfaces to a series of tessellating triangles before performing processing stages such as rasterization. This combined method benefits from the advantages of using curved surfaces without adding complexity to the rasterization stage but requires a suitable interface to process the surface patch data to form polygon based data. Two methods are commonly employed in the tessellation process for converting the curved surface to a series of polygons: either forward differencing or recursive subdivision. The present invention is derived from the recursive subdivision method.

In the parametric modelling stage of a combined 3-D graphics system (i.e. one that combines a tessellation stage to produce polygons for the latter rendering stage), a plurality of curved surfaces patches are fitted to the surface of the object to define areas of the object. A number of different standards for defining the behaviour of such patches with respect to their defining control points are known. One such standard is Bezier patches, for example see "Advanced Animation and Rendering Techniques" pp 66–68 by Watt & Watt or "Computer Graphics Principles and Practice" pp 471–530 by Foley Van Dam et al. Methods of transforming the control points corresponding to one format of patch to new positions corresponding to a different patch type so that the final surfaces are identical are also known. These patches are often of bicubic order.

Of the common parametric patches, there are two main variations. The first is the family of 'standard' mpm-rational surface patches, while the second is the super-set of rational patches. Rational patches have certain modelling advantages over the simpler non-rational variety but can be slightly more complex to process in some respects. Both types of patches are well described in the previous two references, however to simplify description of the embodiment, the following summary is presented. For a non-rational parametric surface, the 3D position can be described as:

$$\overline{B}_{non-rational}(s, t) = \begin{pmatrix} x(s, t) \\ y(s, t) \\ z(s, t) \end{pmatrix}$$

where each of $x(s,t)$, $y(s,t)$, and $z(s,t)$ are scalar parametric polynomials of the same degree, and $0 \leq s, t \leq 1$. In the case of a bicubic (i.e. the product of two cubics) Bezier surface the polynomial is of degree 6. The Bezier equations and the respective x, y, and z components of the surface's control points define the shape of the surface.

A non-rational surface extends the definition by introducing a fourth polynomial $w(s,t)$ with a corresponding additional positive "w" value in each of the control points. The surface position is then defined by:

$$\overline{B}_{rational}(s, t) = \frac{1}{w(s, t)} \begin{pmatrix} x(s, t) \\ y(s, t) \\ z(s, t) \end{pmatrix}$$

It is also well known in the art (see previous references) that the popular types of parametric surfaces patches can be conveniently expressed in matrix form. For example, a bicubic Bezier patch, $\overline{B}_{bez}(s,t)$ can be expressed as:

$$\overline{B}_{bez}(s, t) = [s^3 \, s^2 \, s \, 1] Q P Q^T \begin{bmatrix} t^3 \\ t^2 \\ t \\ 1 \end{bmatrix}$$

where Q is a matrix of scalar constants and P is the matrix of control points for the surface $$Q = \begin{bmatrix} -1 & 3 & -3 & 1 \\ 3 & -6 & 3 & 0 \\ -3 & 3 & 0 & 0 \\ 1 & 0 & 0 & 0 \end{bmatrix} P = \begin{bmatrix} P_{00} & P_{01} & P_{02} & P_{03} \\ P_{10} & P_{11} & P_{12} & P_{03} \\ P_{20} & P_{21} & P_{22} & P_{03} \\ P_{30} & P_{31} & P_{32} & P_{03} \end{bmatrix}$$

Note that P is numbered as $P_{ST}$.

Conversion of the patches to tessellating triangles via the recursive subdivision method is achieved by initially dividing each patch into two sub-patches across either one of its two parameter dimensions (i.e. s or t). This is shown in FIGS. 1a and 1b, in which the patch, with control points, has been portrayed in its parameter space. Each of the sub-patches can then be further sub-divided until the correct level of sub-division is achieved. Once this has been achieved, the resulting sub-patches are each treated as non-planar quadrilaterals, and a set pattern of triangles is superimposed onto the sub-patches, the vertices of the triangles calculated, and the triangles output.

FIG. 2 is a schematic showing conceptual processing of a patch by subdivision with three levels of subdivision applied. From FIG. 2, it can be seen that the processing takes the form of a binary tree progressing from the original, or "root", patch, through intermediate levels of patches to end-point patches termed "leaf" patches. Each leaf patch is used to generate the vertices defining the tessellating triangles required for the rasterization stage of rendering.

In the known system of recursive sub-division, tessellation is traditionally implemented on a CPU as a large number of calculations are required for each stage. Examining the series of calculations involved shows that, when using a CPU, it is efficient to store the intermediate results on a stack, as the same intermediate result is used on a number of the paths to the leaf patches. Use of the stack therefore minimises the number of calculations performed. We have appreciated that for a hardware implementation this is not practical for two reasons: internal (i.e. on-chip) storage is expensive and the retrieval of large amounts of externally stored data can cause a bottleneck in the performance of the system.

The present invention in a first aspect aims to ameliorate these problems. It provides an interface for converting parametric modelled data to polygon based data using recursive sub-division in a way which provides high computational performance whilst minimising memory and memory bandwidth usage.

According to the invention in a first aspect, there is provided an interface according to claim 12. Preferred features of the first aspect of the invention are defined in dependent claims 13 to 16.

There is also provided a method of interfacing between a parametric modelling unit and a polygon based rendering system according to claim 16. Preferred method steps are defined in dependent claims 17 to 19.

A second problem which occurs when interfacing between parametric data and polygon based data in a combined graphics system is that different levels of subdivision may be required to convert parametric data relating to a first patch and parametric data relating to a second patch, where the first and second patches represent adjacent areas of the object being modelled. Patches which define highly curved surfaces must be more highly subdivided than patches which represent a flatter surface when converting the parametric data to polygon based data if the benefits of parametric modelling are not to be lost. If conversion of adjacent patches is not constrained to apply the same level of subdivision to each patch, then cracks can appear in the modelled object because the surface with the higher level of subdivision has extra sample points and thus potentially a slightly different shape. The problem of cracking is illustrated in FIG. 4.

One solution to the problem of cracking is to use the same level of subdivision on all patches. However, this results in some patches being excessively subdivided when they could be tessellated adequately at a less divided level and does not target the processing to the areas where it is necessary to produce adequate results.

Another solution is to process each patch to a level of subdivision sufficient to represent the surface adequately, and to then insert a so-called "stitching mesh" between adjacent surface patches which have different subdivision levels. The stitching mesh thus covers any potential cracks as shown in FIG. 5a. In the diagram, two adjacent patches are subdivided to different levels—one uses 2×4 sub-patches while the other is represented by no subdivisions, i.e. a single quadrilateral. The 'abutting' contour on the 2×4 patch consists of vertices, A, B, C, D, & E, while the equivalent for the 1×1 subdivision consists of the edge AE. To prevent a gap in the surface from appearing, the additional triangles, ABC, ACE and CDE are created.

Unfortunately, such connecting meshes may introduce abrupt changes in surface direction. We have also appreciated that stitching the edges of adjacent patches together is computationally intensive and requires the stitching mesh to be regenerated as the subdivision level changes.

Clark ["A Fast Scan Line Algorithm for Rendering Parametric Surfaces". Computer Graphics 13(2), 289–99] proposed an alternative technique which even permits different levels of subdivision within each patch. As part of this method, the cracking problem, had to be 'solved'. Clark's solution is to deliberately 'flatten' the edges of higher subdivision regions where they meet lower subdivision regions. This is shown in FIG. 5b. The 'shared' boundary between the high-subdivision region and the lowe-subdivision area has been 'flattened' on the high subdivision region so that it mathematically matches the boundary of the low-subdivision region. Comparing this to the approach in FIG. 5a, it can be seen that the vertices, B, C, & D now lie on the line AE.

Although this scheme is mathematically correct, it has a subtle flaw. Computer graphics hardware has limited precision and is unable to represent exact polygon vertex locations. It is therefore frequently impossible to exactly place a flattened vertex on the shared boundary. This leads to problems caused by "T-Joints", as well known in the art. This is illustrated in FIG. 5c, wherein an inaccuracy causes a very small gap to appear. Although this gap is typically tiny, it can still be visible in the rendered images as sets of semi-random pixel holes lying along the edges of the otherwise abutting triangles. As the image is animated, these will 'twinkle' on and off and are easily seen.

We have appreciated that these T-Joints could be fixed by again introducing stitching polygons, however this is a rather inefficient approach since such polygons are tiny and the 'set-up' costs involved in polygon rendering would be better utilised on more significantly sized polygons.

Yet another approach, as used by Pixar's Renderman system, is to subdivide the patches until the resulting polygons are smaller than a pixel. These micro-polygons can then be treated as 'points'. This methord generates vast amounts of data and is not really suitable for real-time rendering.

The options for crack-free subdivision in the current art can thus be summarised as follows:
1) Subdivide all patches of the model to the same subdivision level. This is simple but wasteful of resources.
2) Within each patch subdivide uniformly, and then use stitching polygons to hide gabs between patches divided non-uniformly. It is not ideal as the stitching polygons are additional costs and can induce abrupt changes in direction (as seen in FIG. 5a).
3) Use Clark's method, allowing non-uniform subdivision even within patches, but suffer from T-Joint problems.
4) Apply further stitching polygons to Clark's method.
5) Subdivide the mesh into micro-polygons.

We have appreciated that allowing non-uniform subdivision along patch edges is desirable since it allows the joining of different patches without cracking at the joints. It is also desirable to allow non-uniform subdivision within patches, as is possible with Clark's method, as this can allow a more efficient use of polygons as a gradual transition from a high subdivision edge on one side of a patch to a low subdivision edge on the opposite would require fewer polygons than in a system where the patch is internally subdivided uniformly. We have also appreciated that a system which does not need stitching polygons, either internally or on the boundaries, and also does not introduce T-Joints is highly desirable.

The present invention in a second aspect therefore supports "irregular patch" processing, that is processing of patch data to different subdivision levels in different subdivision directions within the patch but avoiding the problems with Clark's scheme. By forming different numbers of vertices on different edges of the "irregular" patch, we have eliminated the need for stitching meshes to prevent cracking between the tessellated patches that are modelling adjacent areas of objects. Supporting irregular tessellation allows adjacent edges of adjoining patches to have the same number of polygon vertices without affecting the level of subdivision of the patch for the remaining edges. An example, showing the boundary of two unequally subdivided patches, is given in FIG. 13b.

According to the present invention in a second aspect, there is provided an interface according to claim 8. Preferred features of the second aspect of the invention are detailed in dependent claim 9. There is also provided a method of interfacing between a parametric modelling unit and a polygon based rendering system according to claim 10.

Irregular levels of sub-division are supported by automatically generating a mesh from the final sub-patch that has a suitable number of vertices along each edge of the quadrilateral. This allows simple joining of polygonised patches without cracks appearing.

A further problem with known interfacing techniques is so-called polygon popping. For the interfacing of different patches it has been assumed that each edge of every patch has its own subdivision control value. To allow the smooth animation of objects as the lever of subdivision changes, these values are assumed to take floating point or at least contain fractional parts. Polygon popping is a term used to describe the sudden movements in the points of the tessellated polygons that can occur when a small fractional change in the subdivision control value causes an extra step of processing (i.e. an extra binary subdivision of the patch) to be performed. Although the edge subdivision control value may take any value, the preferred tessellation technique is constrained to perform binary patch subdivision to the next nearest power of 2. Thus increasing the subdivision ratio even a small amount may cause the actual level of subdivision to increase dramatically. For example if the subdivision value specified for each edge is 4, then subdivision results in 16 leaf patches. If the subdivision value for each edge is increased from 4 to 4.1, the next larger power of 2 is 8 and the resulting subdivision gives rise to 64 leaf patches. Thus many new triangles have appeared in the object. Unless this process is well controlled it causes undesirable visual effects in the animation as shown in FIG. 3.

In FIG. 3a, the curved surface has been subdivided into two quadrilateral regions. The 'front-most' curved edge of the patch is thus approximated by the line segments AB and BC. In FIG. 3b, the level of subdivision is increased (in one dimension only) so that along the front edge, two new points, D & E, have been generated. The front edge of the patch is then represented by the line segments AD, DB, BE and EC. The change in shape from ABC to ADBEC is relatively large, and the new points D & E can be said to have jumped or "popped" into view. This is most readily seen in this example with point E which will have appeared to have jumped from the position E'.

The present invention, in a third aspect, aims to ameliorate the visual problems associated with polygon popping.

According to the present invention in a third aspect there is provided an interface according to claim 1.

Preferred features of the third aspect of the invention are defined in dependent claims 2 and 3. There is also provided a method of interfacing between a parametric modelling unit and a polygon based rendering system according to claim 4. Preferred method steps are defined in dependent claims 5 to 7.

The present invention in a third aspect produces a smoother looking animated image when changing levels of detail of a model using high order surfaces. Preferably it uses a weighted blend between the linear and cubic subdivision of the final tessellated leaf-patch. The weighting factor for this blend is preferably determined by the ratio between the required subdivision value and next smaller power of 2.

When lighting and shading operations are applied to surfaces in 3-D graphics, there is usually a requirement that the surface normal at a point, i.e. a vector perpendicular to the surface at that location, be known. For the purposes of shading a tessellated surface, surface normals need only be computed at the computed triangle verticles.

As descrived by Watt and Watt, Forley et al, and Farin, ["Curves and Surfaces for CAGD. A Practical Guide". 4$^{th}$ Edition, Academic Press, ISBN 0-12-249054-1, pp 244–247], the standard way to obtain the normal at a point is to calculate two (linearly independent) tangent vectors at that point and take their cross product. If desired, the result can later be converted into a unit computing the first partial derivatives of the surface with respect to the s and t parameters.

Without loss of generality, if we restrict the surface normal calculations to only be done at the corner points of patches, then non-rational Bezier surfaces have the very convenient property that the differences between a corner control point and each of its two nearest edge control points are scalar multiples of the respective first partial derivatives. This is shown in FIG. 19 wherein 'Tangent S' coincides with the difference of corner point $P_{00}$ and its neighbour control point $P_{10}$, while 'Tangent T' coincides with the difference between the corner and control point $P_{01}$.

A number of systems use this fact (in addition to repeated subdivision) to compute the normals at various locations on the patch.

Unfortunately, this calculation can frequently fail. The requirement is that the tangent vectors are linearly independent and control points of the Bezier patch, especially those neighbouring the corner points, can sometimes be coincident. This means that one or both of the first partial derivates may be zero, resulting in an incorrect normal. Such surfaces patches are often referred to as 'degenerate', and some systems may consider them to be 'illegal'. This is rather unfortunate as such surface arrangements of control points are often needed to model completely valid shapes and can easily be generated by modelling software packages.

One known and rather pragmatic solution is that of evaluating the surface at two points slightly offset from the corner in the s and t parameters. The two tangent vectors are then approximated by taking the differences between these computed points and the patch corner. This will usually provide an adequate result, but is costly in terms of additional calculation.

By referring back to the definition of a tangent vector and applying calculus, one can see that the $2^{nd}$ partial derivative can be employed if the first is zero. Watt and Watt ["Advanced Animation and Rendering Techniques. Theory and Practice". ACM Press. ISBN 0-201-54412-1] demonstrate, again for non-rational Beziers patches, that in this situation the difference between the corner control point and the subsequent multiple of the $2^{nd}$ partial derivative. Again referring to FIG. 19, if $P_{01}$ and $P_{00}$ were coincident, for example, then the difference of $P_{02}$ and $P_{00}$ would yield a potential tangent. If this were also zero, a similar process can be employed for the $3^{rd}$ partial derivative by taking the difference with $P_{03}$.

Unfortunately, even this approach can fail. All the points along an edge of patch may be coincident, as may occur when a patch is modelling an octant of a sphere and the patch has become 'triangular'. In this particular situation a $2^{nd}$ partial derivative may be chosen. Farin also describes an even subtler problem: although non-zero partial derivatives in s and t might exist, in some situations they can be parallel. The cross product will then give a zero, and hence invalid, normal. Farin describes the solution for one particular case.

In a fourth aspect, the invention will present a method of computing the surface normal which is not only robust but also efficiently computes the normals for Rational Bezier surfaces.

Embodiments of the invention will now be described in more detail in accordance with the accompanying drawings in which:

FIG. 1a is a schematic diagram showing the subdivision of an n–$1^{th}$ level patch in t to form a top half $n^{th}$ level subpatch and a bottom half $n^{th}$ level subpatch (These are shown physically separated in the diagram for clarity.);

FIG. 1b is a schematic diagram showing the subdivision of an n–$1^{th}$ level patch in S to form a left half $n^{th}$ level subpatch and a right half $n^{th}$ level subpatch;

FIG. 3a is a diagram showing a curved surface approximated by a first tessellation process producing vertices ABC along the 'front edge', while

FIG. 13a is a tessellation pattern for a right edge irregular leaf-patch;

FIG. 13b shows the junction of the irregular patch from 13a and a higher subdivision level patch.

FIG. 14 is a schematic showing generation of fan patches for estimating the additional vertices of the irregular patch of FIG. 13a;

Figure 22A:
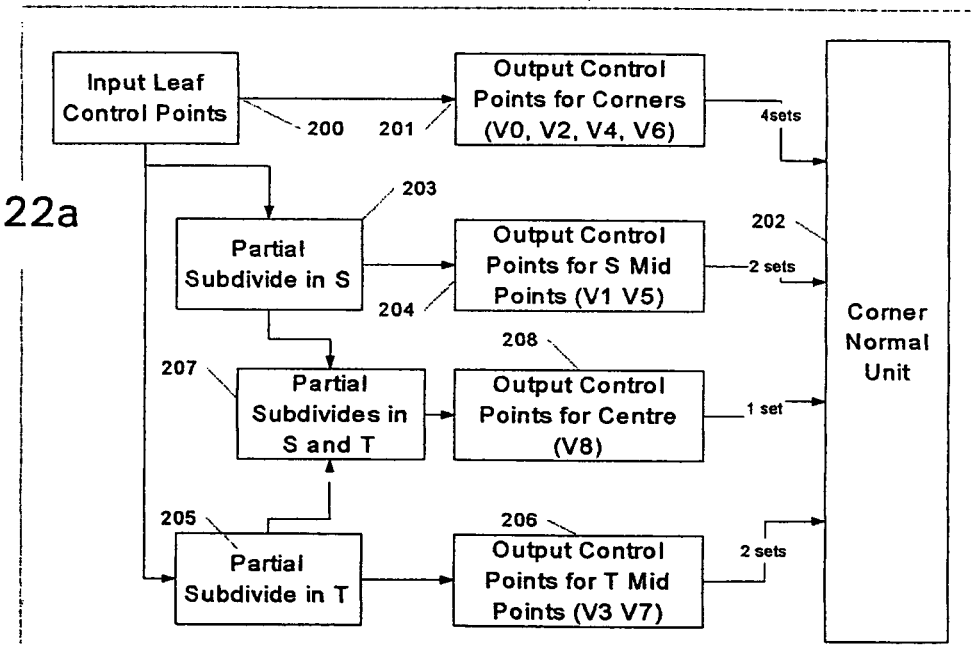
Figure 22B:
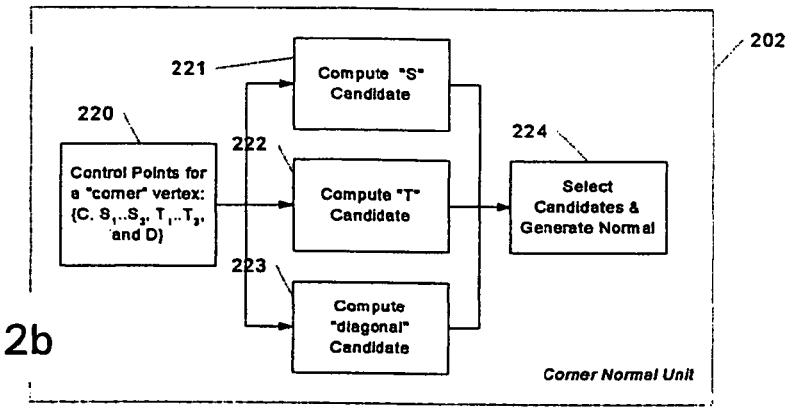
Figure 23:
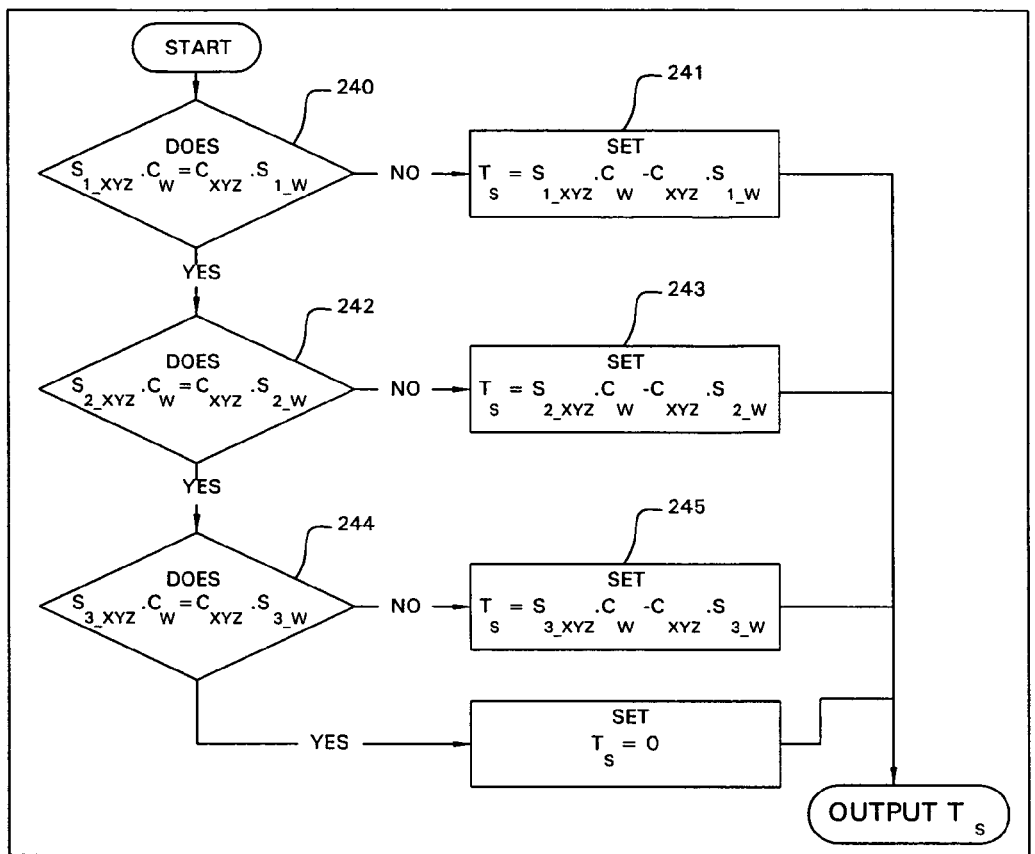
Figure 24:
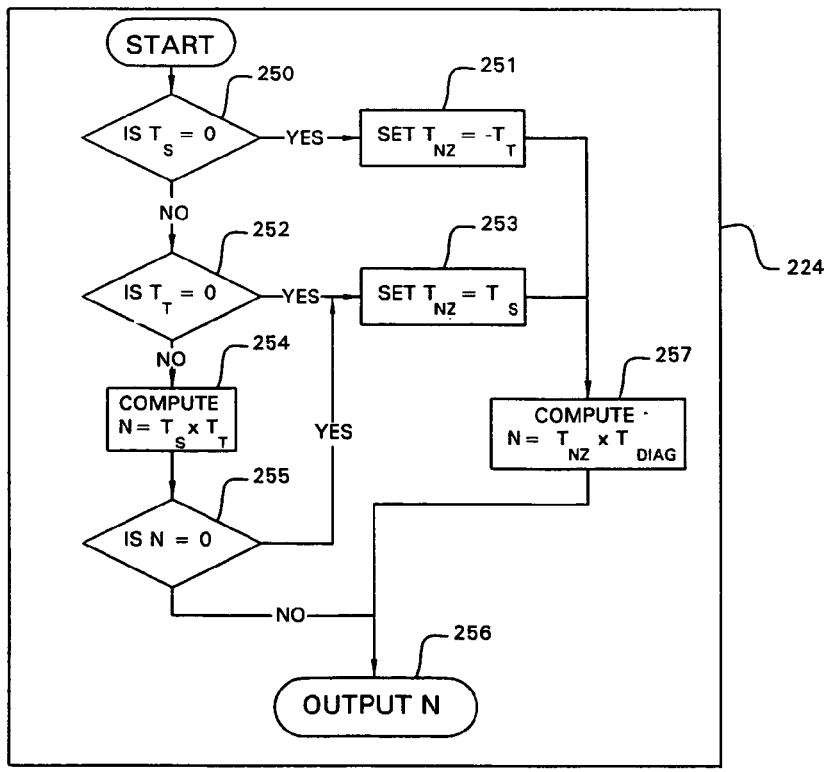

FIG. 22(a) describes the steps taken to produce the required control points for the generation of 9 vertex normals for a tessellated leaf patch;

FIG. 22(b) further describes a part of this normal generation process;

FIG. 23 describes the steps/apparatus used in the derivation of a candidate tangent vector in one parameter dimension at the corner of a rational Bezier patch;

FIG. 24 describes the steps/apparatus used to combine three candidate tangent vectors at a patch corner to produce a surface normal.

DESCRIPTION OF PREFERRED EMBODIMENTS OF THE INVENTION

The interface is intended for use in a 3-d graphics system using a parametric modelling unit and a polygon based rendering system to allow the parametric data modelling the object to be converted to a format which can be used by the polygon based rendering system to process the data for display.

Figure 2:
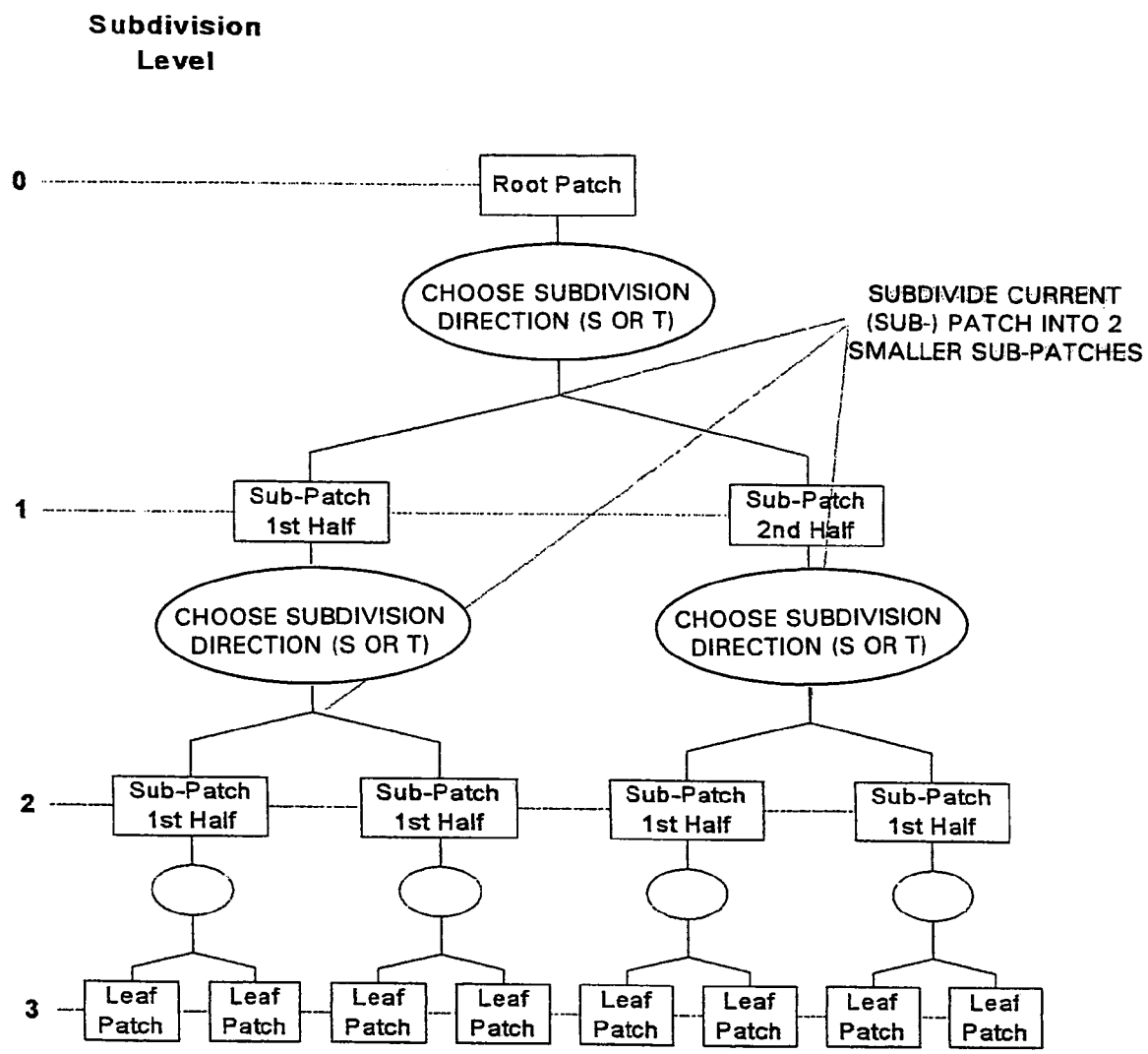
FIG. 2 is a schematic diagram showing the possible choices of subdivision options of a root patch to intermediate patches and ultimately to leaf-patches for a patch being subdivided into 8 leaf sub-patches, the choice of S or T subdivision direction at each stage being determined by supplied subdivision parameters.
Figure 3A:
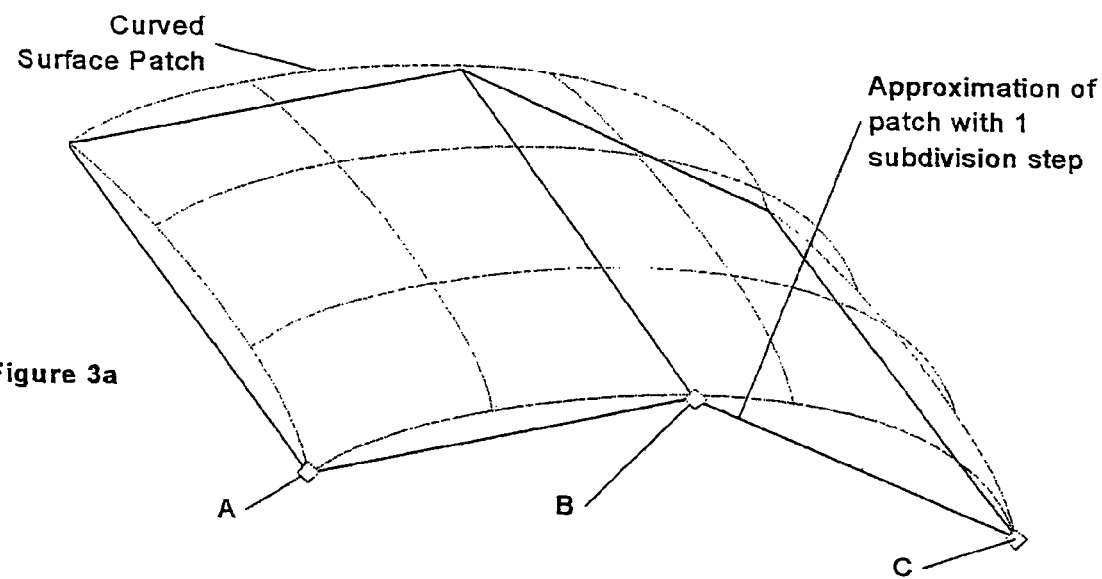
Figure 3B:
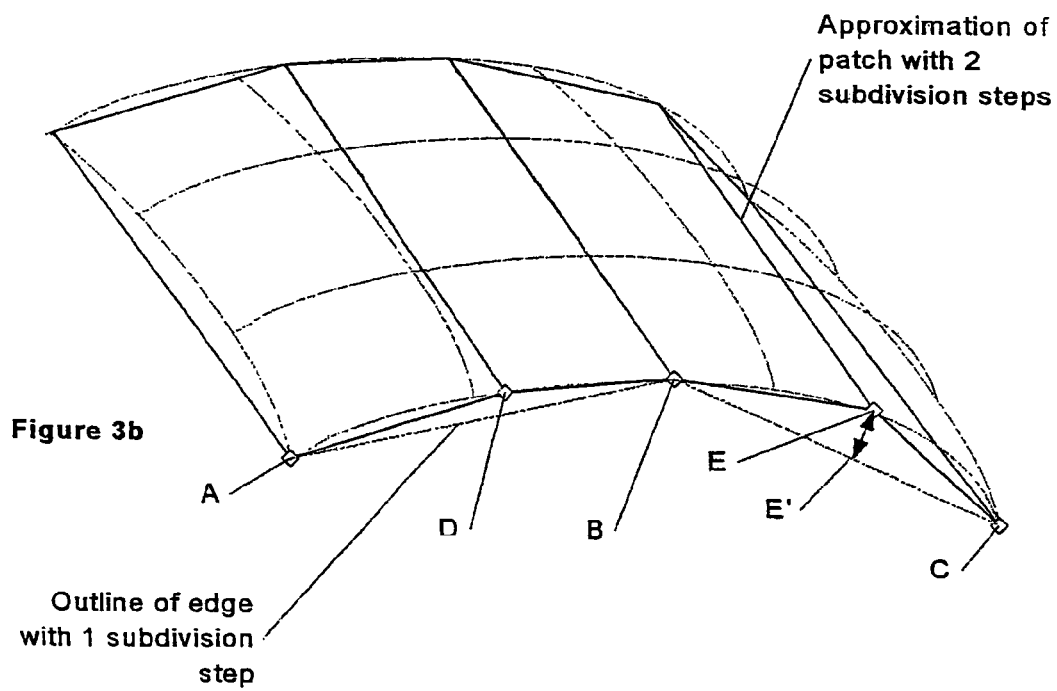
FIG. 3b shows the same surface approximated by a second tessellation process producing vertices ADBEC along the front edge showing the relatively large change in shape between tessellation processes resulting in polygon popping.
Figure 4:
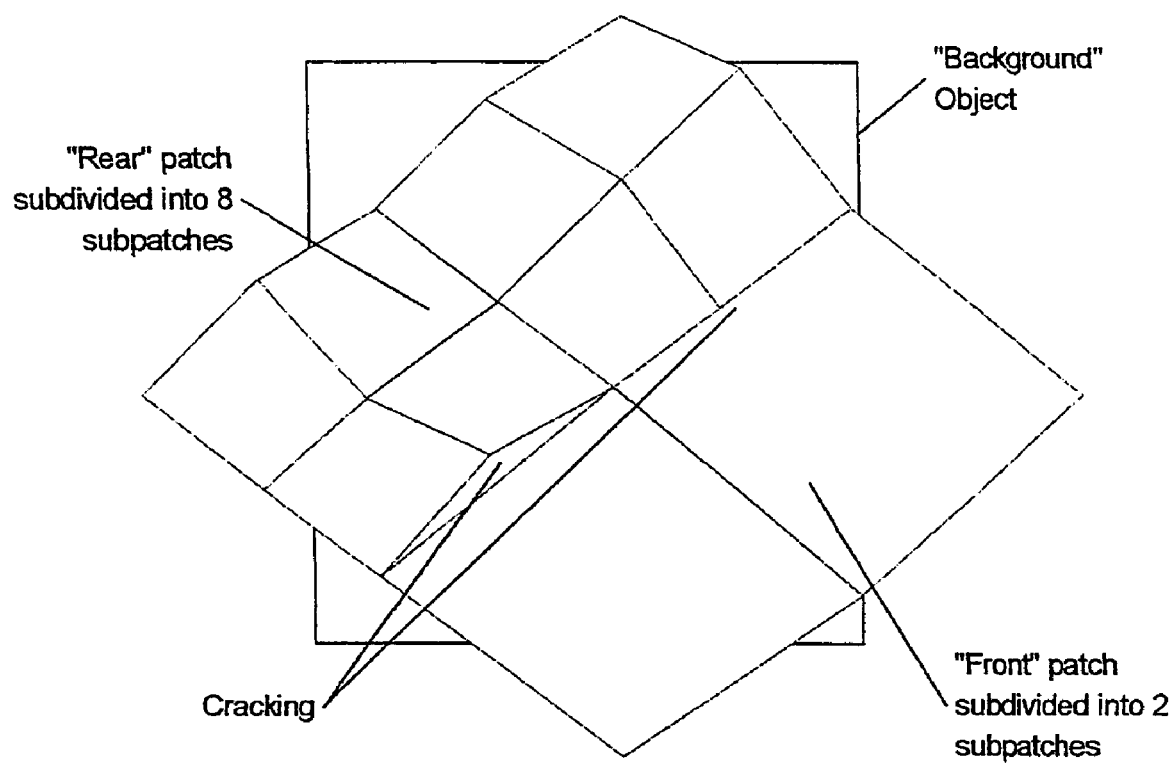
FIG. 4 illustrates the problem of cracking when adjacent patches are subdivided to different subdivision ratios.
Figure 5A:
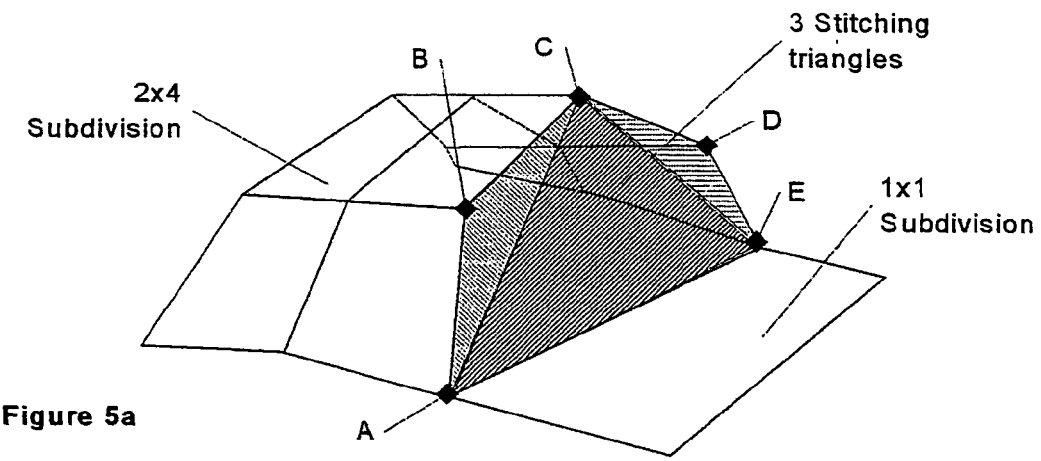
FIG. 5a is a stitching mesh used by known polygonisation systems to overcome the problem of cracking.
Figure 5B:
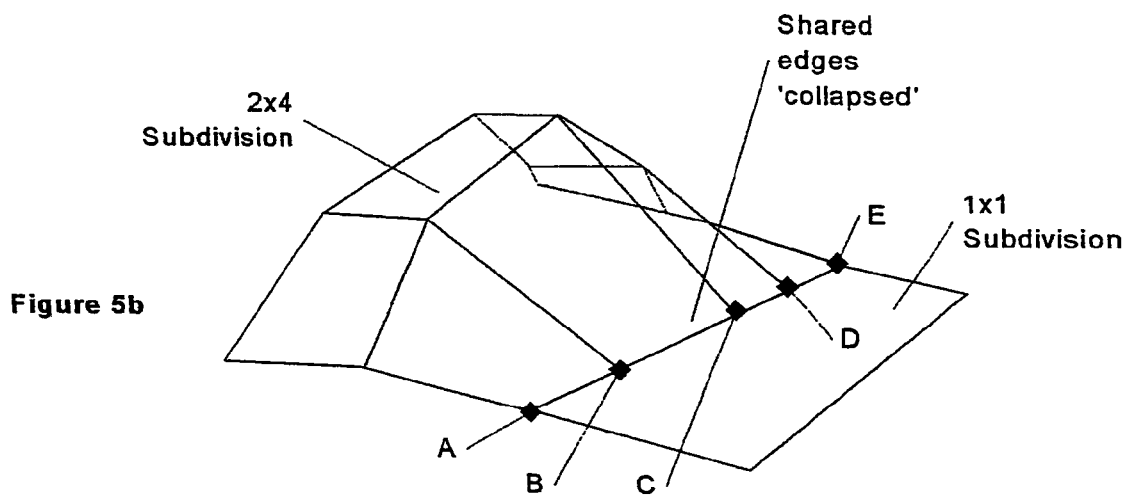
FIG. 5b shows Clark's approach to stopping the cracking problem.
Figure 5C:
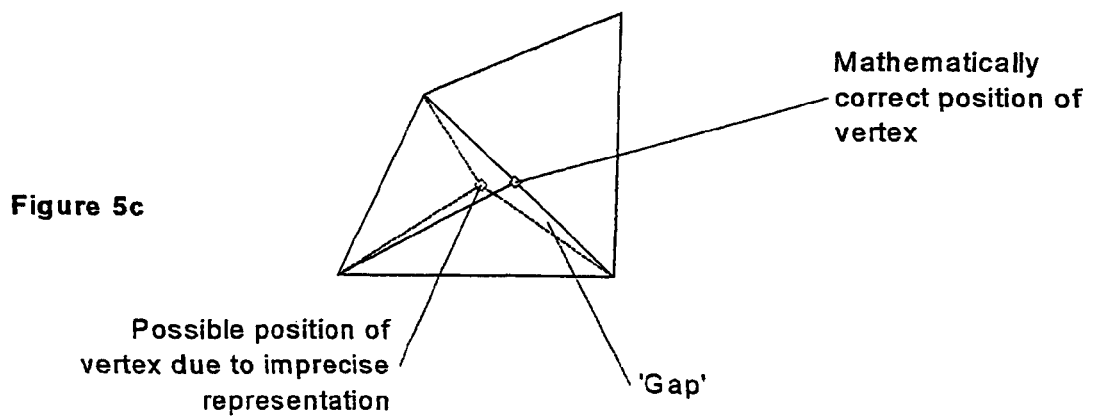
FIG. 5c shows the "T-Joint" problem in computer graphics.
Figure 6:
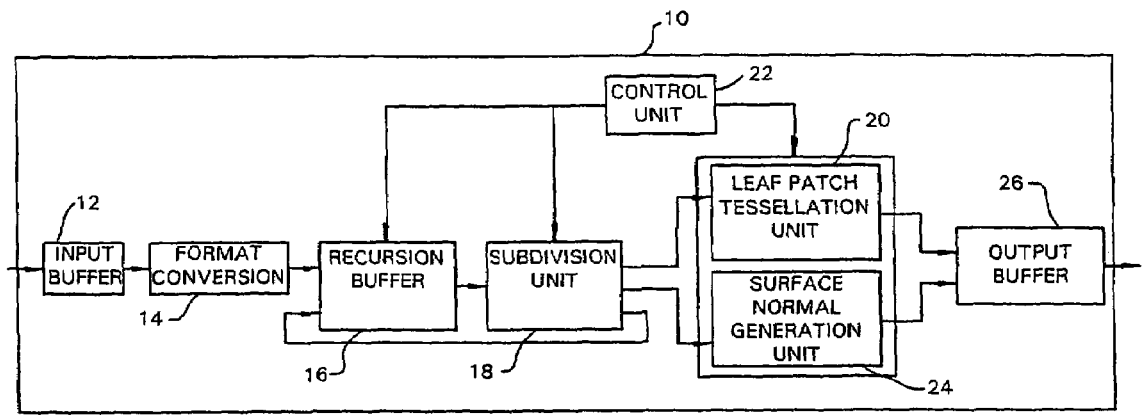
FIG. 6 is a schematic diagram showing a preferred embodiment of an interface.

FIG. 6 is a block diagram of the interface. The interface 10 includes an input buffer 12, format converter 14, recursion buffer 16, subdivision unit 18, weighting processor 20, direction processor 24, output buffer 26 and control unit 22.

In parametric modelling units, patches are used to define a surface. A typical, bicubic patch is defined by 16 control points. Each control point is an N-dimensional vector defines a number of elements (usually including (xyzw) position, colour, and texture mapping information). Typically for 3D graphics systems, the data for each patch is grouped by control point and it is this control point grouped data which are input to the interface 10 via the input buffer 12. The subdivision unit requires the data to be grouped by element rather than by control point.

The input buffer 12 takes the control point grouped data, rearranges the data to the element-wise format required by the subdivision unit 18 and outputs the data to the format convertor 14.

The subdivision unit of the interface 10 is designed to process a particular standard of patch known as a Bezier Bicubic Patch. Other patch formats, for example based on Catmull-Rom and B-Splines, are also used in 3D modelling. To enable the interface 10 to process other patch formats, a format converter 14 is provided. The format of the patch represented by the element-wise data output by the input buffer 12 is determined. If the format of the data is not Bezier bicubic, the format converter 14 converts the data to Bezier bicubic format via a series of optimised matrix multiplies. Methods of converting between various patch formats are known in the field of 3-d graphics and are not described here. The format converter 14 maintains a library of conversion algorithms and applies the appropriate conversion algorithm to the data to covert it to Bezier bicubic format.

The recursion buffer, or store, 16, provides storage for data corresponding to two patches: the root patch and an intermediate patch. The root patch must be accessed multiple times during the subdivision process because it is the starting point to each intermediate patch. Storing intermediate patch data in the recursion buffer 14 reduces the data transfer in the interface, improving efficiency and reducing processing time. This area of the recursion buffer 14 effectively provides a working area for intermediate results.

Patch subdivision to the required level is performed by the subdivision unit 18. The input to the subdivision unit 18 is fed from the recursion buffer 16. Subdivision is split into four categories: subdivision in t taking the top half of the patch, subdivision in t taking the bottom half of the patch, subdivision in s taking the left half of the patch and subdivision in s taking the right half of the patch.

A Bezier patch has 16 control points and the control point data is arranged in a 4×4 matrix. Subdivision from a first level patch, n−1, to the next level sub-patch, n, in any category is achieved by applying the following recursive equations to the patch data:

$$A_i^n = A_i^{n-1};$$

$$B_i^n = (A_i^{n-1} + B_i^{n-1})/2;$$

$$C_i^n = (A_i^{n-1} + 2B_i^{n-1} + C_i^{n-1})/4;$$

$$D_i^n = (A_i^{n-1} + 3B_i^{n-1} + 3C_i^{n-1} + D_i^{n-1})/8; \qquad \text{Eqn 1}$$

where Ai, Bi, Ci and Di refer to appropriate elements of a 4×4 control point matrix according to the category of subdivision. The way in which the element indexing is controlled is described below for each category of subdivision.

The above equations are recursive; for example calculation of $B_i^n$ requires the previous of $A_i^{n-1}$ and $B_i^{n-1}$. The subdivision calculations are performed efficiently by pipelining the operations as shown in FIG. 7 and described below.

Figure 7:
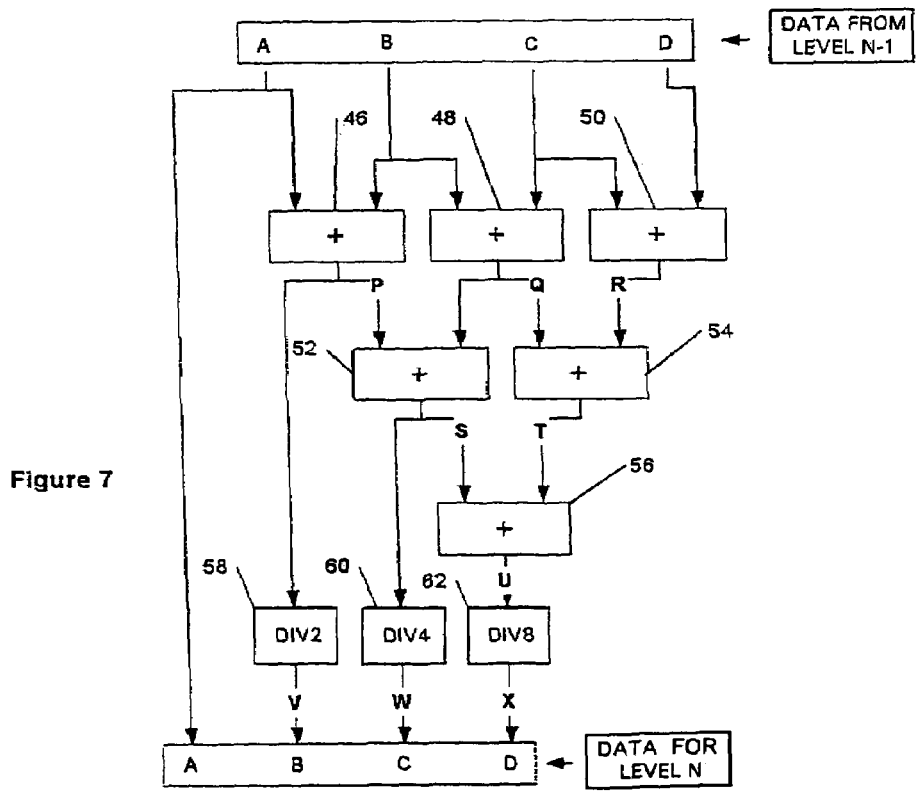
FIG. 7 is a schematic showing the calculation stages of a subcalculation unit.

FIG. 7 shows a subcalculation unit. The input to the subcalculation unit is 4 control point values $A^{n-1}$, $B^{n-1}$, $C^{n-1}$ and $D^{n-1}$, of an n−1$^{th}$ level patch. A first calculation stage comprises 3 adders 46, 48 and 50 arranged in parallel and each coupled to the input and to a second calculation stage. One of the adders 46 is also coupled to a fourth calculation stage.

The second calculation stage comprises 2 adders 52 and 54 arranged in parallel. Each adder is coupled to the output of 2 of the 3 adders of the first calculation stage. One adder 52 is coupled directly to the fourth calculation stage. Both adders 52 and 54 are coupled to the third calculation stage.

The third calculation stage comprises a single adder 56 which takes as its input the outputs from both adders 52 and 54 of the second calculation stage. The output of the adder 56 is coupled to the fourth calculation stage.

The fourth calculation stage comprises 3 dividers 58, 60 and 62 arranged in parallel which respectively divide the output of adder 46 by 2, the output of adder 52 by 4 and the output of adder 56 by 8.

The output of the subcalculation unit outputs are control point values of the n$^{th}$ level patch, namely $A^n = A^{n-1}$, and the outputs of the three dividers 58, 60 and 62 as $B^n$, $C^n$ and $D^n$ respectively.

The pipelined system achieves high system clock rates. Calculation of $A^n$, $B^n$, $C^n$ and $D^n$ the values of control points in the subpatch from $A^{n-1}$, $B^{n-1}$, $C^{n-1}$ and $D^{n-1}$ the values of the corresponding control points in the patch which is being subdivided, is performed by the subcalculation unit in a series of additions. The first stage of the calculation is to calculate in parallel first stage intermediate values P, Q and R where $$P = A^{n-1} + B^{n-1}$$

$$Q = B^{n-1} + C^{n-1}$$

$$R = C^{n-1} + D^{n-1}.$$

The second stage is to calculate in parallel second stage intermediate values S and T where S=P+Q and T=Q+R.

The third stage is to calculate a third stage intermediate value U, where U=S+T.

In the fourth stage the values V=P/2, W=S/4 and X=U/8 are calculated in parallel and the values $A^n = A^{n-1}$, $B^n = V$, $C^n = W$ and $D^n = X$ are outputted from the subcalculation unit.

Each subcalculation unit calculates the values of four new control points in the n$^{th}$ level sub-patch. Calculation of each set of four new control points is independent of the calculation of the other 12 control points. Thus, by using four subcalculation units in parallel, the 16 new control points of the n$^{th}$ level sub-patch may be calculated in a minimum number of clock cycles thereby achieving a high throughput. The outputs of the four subcalculation units are assembled in the output multiplexer (mux) 44 to generate the control point matrix for the n$^{th}$ level sub-patch.

The subcalculation units are required to work on different elements of the 4×4 control point matrix depending on which category of subdivision is being carried out. However, by including input and output multiplexers in the subdivision unit, four identical subcalculation units may be used to calculate the new control points. The function of the input and output muxes will now be described.

Input Mux

The function of the input mux is to allow the rows and columns of the n−1$^{th}$ level patch control point matrix to be swapped to control the category of subdivision implemented by the subcalculation units.

For subdivision in t, the rows of the control point matrix are indexed A to D and the columns of the control point matrix 1 to 4 from left to right. The direction of indexing for the rows depends on whether a top half patch or bottom half patch is to be generated. To generate a top half patch, the rows are indexed starting with A as the top row of the matrix and ending with D as the bottom row of the matrix. Thus the top row of control points of the nth level top half sub-patch are identical to the top row of control points of the n−1th level patch. The remaining three rows of the nth top half sub-patch are related to the rows of the control points of the n$^{th}$ level patch as defined in the equation 1 above. Similarly, the bottom row of control points of the nth level bottom half sub-patch are identical to the bottom row of the control points of the n−1th level patch and the remaining rows are related to the rows of the n−1th level matrix in accordance with equation 1.

Figure 8A:
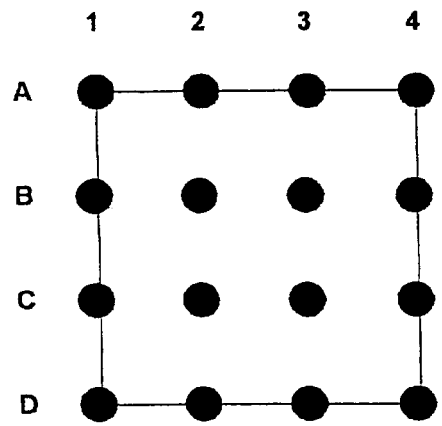
FIGS. 8a, 8b, 8c and 8d show respectively the indexing of rows and columns of patch data for top half subdivision in t, bottom half subdivision in t, left half subdivision in S and right half subdivision in S using the calculation of FIG. 7.
Figure 8B:
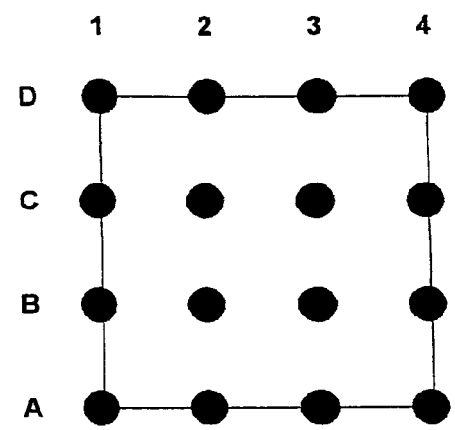

FIGS. 8a and 8b show the appropriate indexing of a n−1th level patch in order to perform division in t taking the top half sub-patch and division in t taking the bottom half sub-patch respectively. Thus, to generate a bottom half from subdivision in t, the rows of the may first be inverted and then processed as for top half sub-patch generation forming interim data which must then be arranged to form the required sub-patch data.

For subdivision in s, the columns of the patch are indexed A to D and the rows are indexed 1 to 4 from top to bottom. The direction of indexing for the columns depends on whether a left half sub-patch or right half sub-patch is to be generated. To generate a left half sub-patch, the columns are indexed starting with A as the left column and ending with D as the right column of the patch. Thus the left hand column of control points of the level left half sub-patch are identical to the left hand column of control points of the n−1th level patch. The remaining three columns of the left half sub-patch are related to the columns of the control points of the n−1th level patch as defined in the equation 1 above. Similarly, the right hand column of control points of the $n^{th}$ level right half sub-patch is identical to the right hand column of the control points of the n−1th level patch and the remaining columns are related to the columns of the n−1th level patch in accordance with equation 1.

Figure 8C:
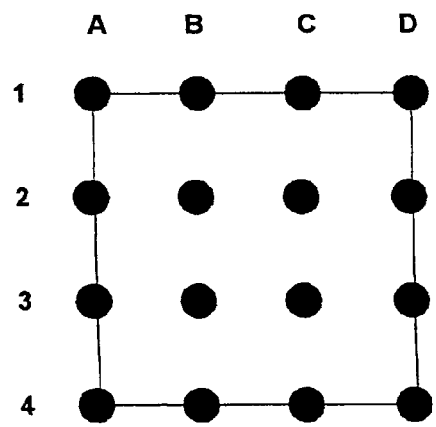
Figure 8D:
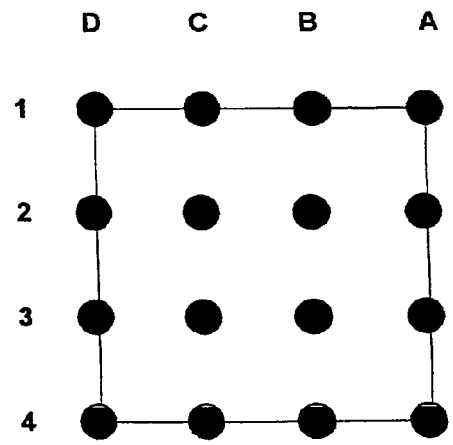

FIGS. 8c and 8d show the appropriate indexing of a n−1th level patch in order to perform division in s taking the left half sub-patch and division in s taking the right half sub-patch respectively. Thus, to generate a left half sub-patch from subdivision in s, the rows and columns of the patch may first be swapped and the rearranged patch processed as for top half sub-patch generation. Similarly to generate a right half sub-patch from subdivision in s, the rows are inverted then the rows and columns swapped. Processing for a top half sub-patch subdivided in t is performed and the resulting control points rearranged by the output mux to correspond to the required right half subpatch.

Output Mux

The function of the output mux is analogous to that of the input mux. It arranges the interim data output by the subdivision unit according to the category of subdivision to form the required subpatch control point matrix. Assuming that the subcalculation unit is set up to perform top half subdivision in t, the output of the subcalculation unit must be rearranged to produce bottom half subdivision in t and left and right half subdivision in s. The output mux assembles the four outputs of the subcalculation units into a single matrix and reverses the rearrangement carried out by the input mux to produce the required subpatch control matrix.

Once the element-wise control data for the $n^{th}$ level sub-patch has been assembled in the appropriate order, that is as per FIGS. 7a, 7b, 7c or 7d according to the category of subdivision, it is either outputted to the weighting processor 20 and direction processor 24 if it relates to a leaf patch, or returned to the recursion buffer 16 if it relates to an intermediate patch.

Figure 9:
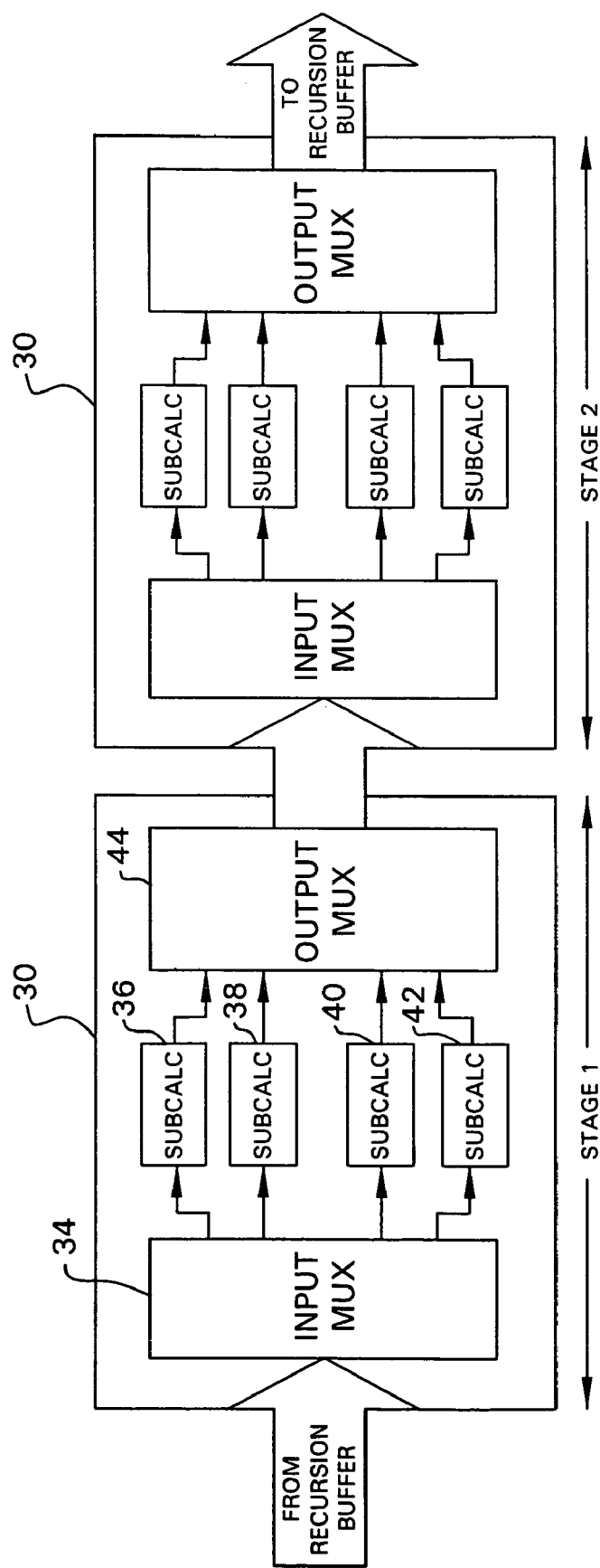
FIG. 9 is a schematic of a two stage subdivision unit.

In the interface, the subdivision calculation is implemented as shown in FIG. 9. This implementation of the subdivision architecture has been found to be very efficient. A prior-art method presented in Watt & Watt requires more 'caling' steps which can become a significant cost in a hardware floating point implementation. The subdivision unit 18 comprises a number of stages. Each stage performs one level of subdivision. The second stage subdivision may be bypassed if the required level of subdivision is reached after processing by the first stage. In the presently preferred embodiment, two stages, a first stage 30 and a second stage 32, are implemented in the subdivision unit 18. Inclusion of two subdivision stages has the advantage of increasing the raw calculation performance of the system for a given amount of data bandwidth from the recursion buffer. The number of stages may be changed to provide the required size/performance trade-off in the final system. Each stage consists of an input multiplexer 34, four subcalculation processors 36, 38, 40 and 42 and an output multiplexer 44.

In the first stage, data for an element of the patch is read from the recursion buffer 16. The input and output muxes 34 and 44 respectively allow the rows and columns of the matrix of elements to be rearranged controlling the calculation which is performed. The calculations options are Subdivide in s, output left half
Subdivide in s, output right half
Subdivide in t, output top half
Subdivide in t, output bottom half
Bypass The input mux 34 rearranges the matrix according to the category of subdivision required and passes four control points of the n−1th level patch to each subcalculation unit for processing. The output of each subcalculation unit is fed to the output mux 44 which assembles the outputs of the subcalculation unit and arranges the matrix into the required sub-patch according to the category of subdivision required. The output from the output mux 44 of stage 1 is processed as the input to the input mux 34 of stage 2. The stage 2 output is either fed back to the recursion buffer 16, or fed on to the following calculations stages if a leaf patch has been reached.

The use of the input and output muxes eliminates the need for four separate blocks of subcalculation units and therefore minimises the number of component parts of the curved surface subdivision system.

Figure 10:
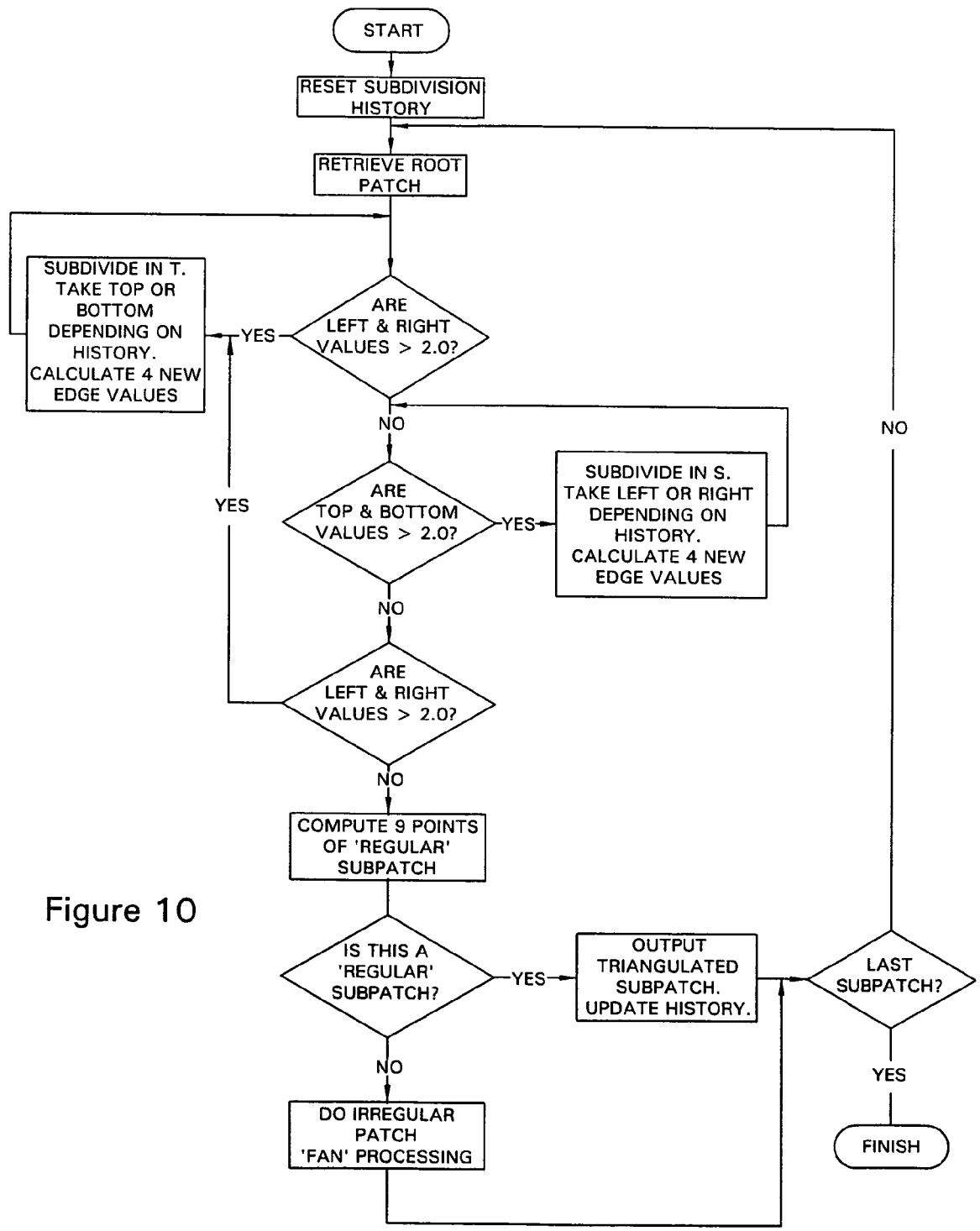
FIG. 10 is a flow chart showing the operation of the control unit.

The operation of the subdivision unit 18 is controlled by a series of instructions presented from the control unit 22. The control unit 22 operates on the algorithm presented in the flowchart of FIG. 10. The control unit 22 causes a root patch to be taken from the recursion buffer 16 and passed to the input mux 34 of the first stage.

It is assumed that the assignment of the four patch subdivision levels, corresponding to the four edges of the patch, have been computed externally either in software or hardware.

The control unit 22 determines whether subdivision in the t dimension is required by testing the subdivision values of the left and right hand edges of the root patch control matrix. If neither the left nor the right hand edge value lies between the values 1.0 and 2.0, subdivision of the patch in t is required. The left and right hand edge values are divided by 2. A command to divide in t is sent by the control unit 22 to the subdivision unit 18 causing the appropriate rearrangement of the data by the input mux and arrangement of the interim data by the output mux. Having divided in t it is then necessary to calculate new subdivision values for the top and bottom edges. If top half subdivision is carried out then the top row of the control matrix is unchanged and the top value for the top half sub-patch is carried over from the undivided matrix. However, top half subdivision results in the bottom row of the sub-patch differing from that of the undivided matrix. The bottom value must therefore be updated. The new value is calculated as either the average or preferably the geometric mean of the top and bottom values of the undivided matrix. The geometric mean is preferable because it more usefully distributes the levels of subdivision across the patch. For bottom half subdivision, it is the top value of the subdivided matrix which must be calculated whilst the bottom edge value is carried over from the undivided matrix. The top edge value is calculated in the same way as that of the bottom edge value for top half subdivision.

The control unit 22 continues subdivision in the t dimension until the exit condition is met, at which point processing advances to the s dimension. The exit condition is met when either the left or the right hand edge value lies between 1.0 and 2.0 indicating that further subdivision in t of the entire patch is not required. Further processing of the patch may however be required if the resulting patch is irregular. Processing of irregular patches is described later.

Processing in the s dimension proceeds in a similar way but with the top and bottom edge values being tested to determine whether subdivision in s is required. New right and left edge values are calculated for the left half subdivision and right half subdivision respectively. The new right and left edge values are calculated as either the average or preferably the geometric mean of the left and right edge values of the undivided matrix. Once the s dimension exit condition is met, t is re-checked and the processing loops as required. The exit condition for s subdivision is met when either the left or right edge value is between 1.0 and 2.0. As with t subdivision, further processing of the resulting patch may be necessary if it is irregular.

Once both s and t exit conditions have been met the root or intermediate patch has been processed to a first level of subdivision and has generated data representing an endpoint, leaf patch. A command is then sent from the control unit 22 to the subdivision unit 18 to output its leaf patch data.

The control unit 22 monitors the number of passes through its algorithm that have been completed. On the first pass, the control unit 22 sends a control signal to the subcalculation unit 18 to force the top half sub-patch to be calculated for division in t, and the left half sub-patch to be calculated for division in s. A history of the commands sent to the subdivision unit 18 from the control unit 22 is recorded. This command history is then used on subsequent passes to ensure that all the other sequences are exercised. The final pass of the control unit algorithm has been executed when dividing in t always takes the bottom half sub-patch as output, and dividing in s always takes the right half sub-patch as output.

Processing of Regular Leaf Patches

Figure 11:
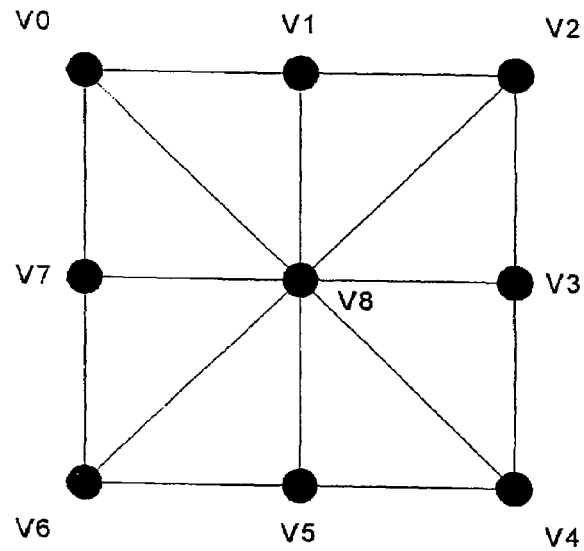
FIG. 11 is a preferred tessellation pattern.

If the leaf patch has each of its final edge values between 1.0 and 2.0, then the leaf-patch is said to be regular. The regular leaf patch is processed to generate nine vertices of a grid of triangles arranged to cover the patch as shown in FIG. 11 by a converter. Preferably the converter is incorporating processer 20. The tessellating triangles cover a square with three vertices set out in a regular array on each side of the square and the ninth vertex positioned in the centre of the square. The triangles are arranged fanning around the square so that each of the eight triangles shares the centre vertex of the square. Alternative patterns, such as that shown in FIG. 12 and often seen in prior art, can also be used.

Figure 12:
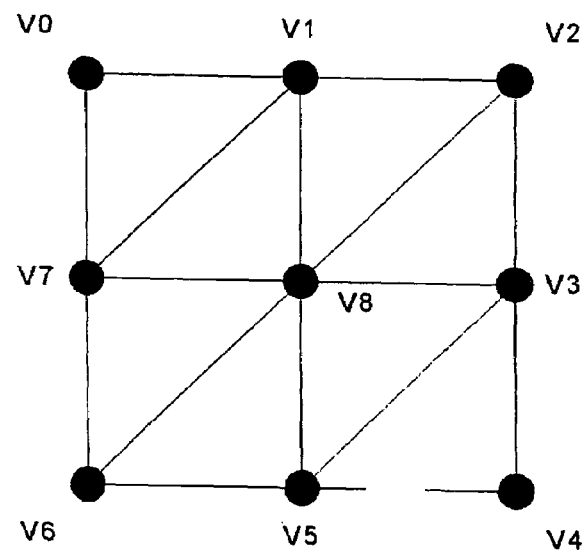
FIG. 12 is an alternative tessellation pattern.

One advantage of the arrangement in FIG. 11 over that of FIG. 12 is that the triangles produced will be independent of the order of the original patch's control points. That is, swapping the definition of S and T in the original patch, or reversing the order of the control points will produce identical results. A second advantage is that it is closer in pattern to that generated when processing 'irregular' leaf patches.

Conversion from the leaf patch to the nine output vertex positions is performed in the "Leaf Patch Tessellation Unit" 20. The corresponding surface normals for these vertices are similarly computed in the "Surface Normal Generation Unit" 24. At this stage in the processing operation, the algorithm for minimizing polygon popping is implemented.

Figure 16:
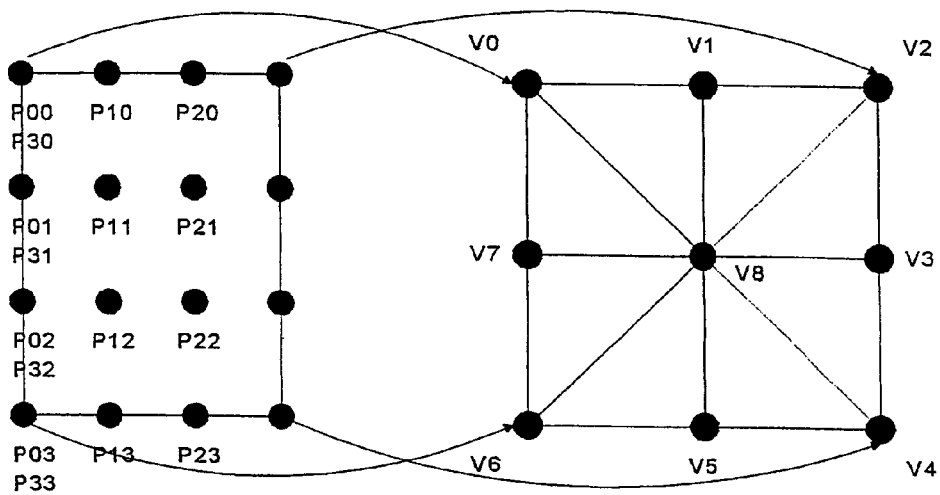
FIG. 16 is a schematic showing the correspondence between the control points P00, P30, and P33 of a leaf-patch and the vertices V0, V2, V6 and V4 of the tessellating triangles.

FIG. 16 shows schematically the conversion from the control point data of a regular patch to the nine vertices of the tessellating triangles. Assume that the 16 control points of the patch are arranged in a 4×4 matrix with the points indexed Pij where j varies from 0 to 3 and indicates which row of the matrix the control point is located with row 0 being the top row and i varies from 0 to 3 and indicates which column of the matrix the control point is located with column 0 being the left hand column. Assume also that the nine vertices of tessellating triangles are arranged in a 3×3 square with the top left vertex indexed V0 and the index incrementing clockwise around the 3×3 square to the centre left vertex, V7, and the central vertex being indexed V8.

The four outer vertices of the tessellating triangles are derived directly from the outer control points of the regular leaf patch. The top left vertex, V0, takes the value of the top left control point, P00, the top right vertex, V2, takes the value of the top right control point, P30, the bottom left vertex, V6, takes the value of the bottom left control point, P03, and the bottom right vertex, V4, takes the value of the bottom right control point, P33.

Generation of the remaining 5 vertices, V1, V3, V5, V7 and V8, is slightly more complex.

Figure 17:
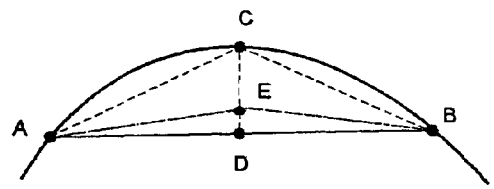
FIG. 17 is a schematic showing the generation of a combined value for vertices V1, V3, V5, V7 and V8.

Consider the diagram of FIG. 17, where the curve can be considered to be one of the edges of the leaf patch, with points A and B being two of the corner vertices, say V0 and V2. If a further subdivision were performed, this would yield a new point on the curve C, which would correspond to a possible position of the middle vertex, V1. Conversely, if the number of subdivisions were to remain the same, then the curve would be approximated by the line AB, and V1 would lie on the line at point D. In order to achieve a smooth transition between points C and D as the level of subdivision changes, a new point E is calculated along the line CD, and this is used as the value of V1. This is expressed in the following equation:

$$E = wC + (1-w)D \qquad \text{Equation 2}$$

where w is the weight factor, derived from the fractional part of the edge subdivision ratio, D is a first vertex value derived at leaf-patch subdivision level and C is a second vertex value derived at the sub-leaf patch subdivision level. (Note that the fractional part of the edge ratio is trivially obtained by examining the mantissa of a binary floating point representation of the value).

D is calculated by taking the mean of the two corner vertices; in the case of FIG. 16, V0 and V2 correspond to points A and B respectively. To calculate C, a left half subdivision in s is performed and C takes the value of the top right control point of the left half subdivided patch. To calculate the value of C for the left(right) edge, the Bezier curve along the left(right) edge of the leaf-patch is evaluated at $t=\frac{1}{2}$. Note that this is identical to just computing Dn in FIG. 7. The calculation for the 'C' point in the tope and bottom edges is analogous. Once the values of C (the second value) and D (the first value) have been calculated, the vertex, V1, is calculated according to equation 2. This calculation is performed by a combiner. The combiner may be an integral part of the tessellation unit 20.

This calculation is repeated for each edge of the leaf patch quadrilateral. The centre point is calculated in a similar fashion, however the calculation of point C for V8 requires a subdivision in both the s and t dimensions. This can be efficient done by using, say, the 'C' values computed from the top and bottom edges, computing two additional 'C' values from the two centre rows of control points, and then re-applying the method of these four values.

Figure 18A:
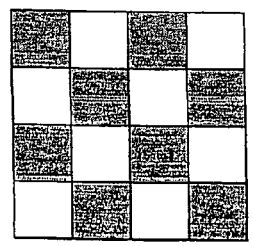
FIG. 18 is a diagram relating to which vertices are used in the calculation of the centre vertex V8 for different leaf-patches.

Because of the preferred tessellation pattern, i.e. shown in FIG. 11, in the calculation of D for V8, one of the diagonal pairs of vertices, either (V0, V4) or (V2, V6) are used. The choice of which diagonal pair is based on the relative position of the leaf patch to the root patch. FIG. 18a shows a chequer board arrangement showing the relative position of leaf patches to the root patch for 16 leaf patches. The leaf patch squares are arranged in four rows and four columns and cover the root patch. Half the squares are shaded and the remaining squares are unshaded in an alternating pattern. The top left square is shaded. Referring to FIG. 18, the shaded leaf patches use (V0, V4) in the calculation of point D whilst the calculation of D for the unshaded leaf patches uses (V2, V6). For other numbers of leaf patches, similar diagrams can be constructed applying the same patterning technique.

Figure 18B:
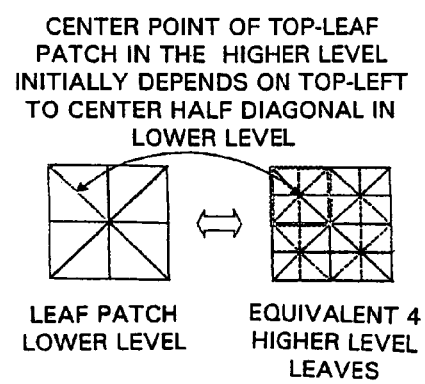

This preferred patterning scheme guarantees that as the subdivision level 'crosses a power of two boundary', the arrangement of triangles will not abruptly change. As the subdivision level is increased, any new triangles created are guaranteed to 'lie inside' the parent triangles. This is shown in FIG. 18b. For example, the introduced centre point in the upper left leaf patch of the more highly tessellated region (shown on the right) would depend on the top-left to centre half-diagonal from the 'parent' leaf (on the left). Note that this is alternating operation would not be necessary for the triangulation pattern shown in FIG. 12.

Irregular Patch Processing

Subdivision is terminated in any one direction, s or t, if either one of the relevant edge values lies between 1.0 and 2.0. Further processing of the leaf patch is required if it is irregular, that is if one or more edges have an edge value which lies outside the range 1.0 to 2.0. An irregular leaf patch may be considered to be a regular leaf patch which requires additional vertices on the edge whose subdivision value is outside range to enable it to be joined to the adjacent patch. The irregular leaf patch is first treated as a regular leaf patch and the nine vertices for the patch are calculated as described above. To calculate the additional vertices, further subdivision is performed. The further subdivision may be carried out in the same subdivision unit as subdivision to form leaf-patches and may be controlled from the control unit 22. The conversion of the fan patches to provide additional vertices may be carried out in the converter for the leaf-patches or in a separate converter.

An example of subdivision processing for an irregular leaf patch with a right edge value outside the range 1.0 to 2.0 is shown in FIGS. 13a and 14. In this example, the right edge subdivision value would be between 2.0 and 4.0 indicating that one additional level of subdivision is required to generate two extra vertices (V23 and V34) required on the right hand edge to prevent cracking. The additional vertices are provided on the edge of the leaf patch whose edge value is outside the 1.0 to 2.0 range; in this case the right hand edge. The triangles described by the additional vertices fan out from the centre vertex of the patch, splitting the original triangles spanning this edge in two. Thus, in the example, the right edge of the irregular patch has five (instead of three) vertices, namely V2, V23, V3, V34 and V4 in a clockwise direction, defining four triangles all with a common vertex at V8: V8-V2-V23, V8-V23-V3, V8-V3-V34 and V8-V34-V4.

V23 and V34 are calculated by performing further subdivisions in t until the right edge value is made to lie between 1.0 and 2.0 and by using the output of the additional subdivision to form a series of fan patches which are used to generate the new vertices, V23 and V34. The fan patches are not used in the calculation of the nine standard vertices, V0 to V8, corresponding to the vertices for a regular leaf-patch.

The processing required to generate the additional vertices for the irregular leaf-patch of FIGS. 13a and 14 is described by way of example. By following the example, it will be clear to the skilled man how to generate additional vertices for other types of irregular patch.

Figure 15:
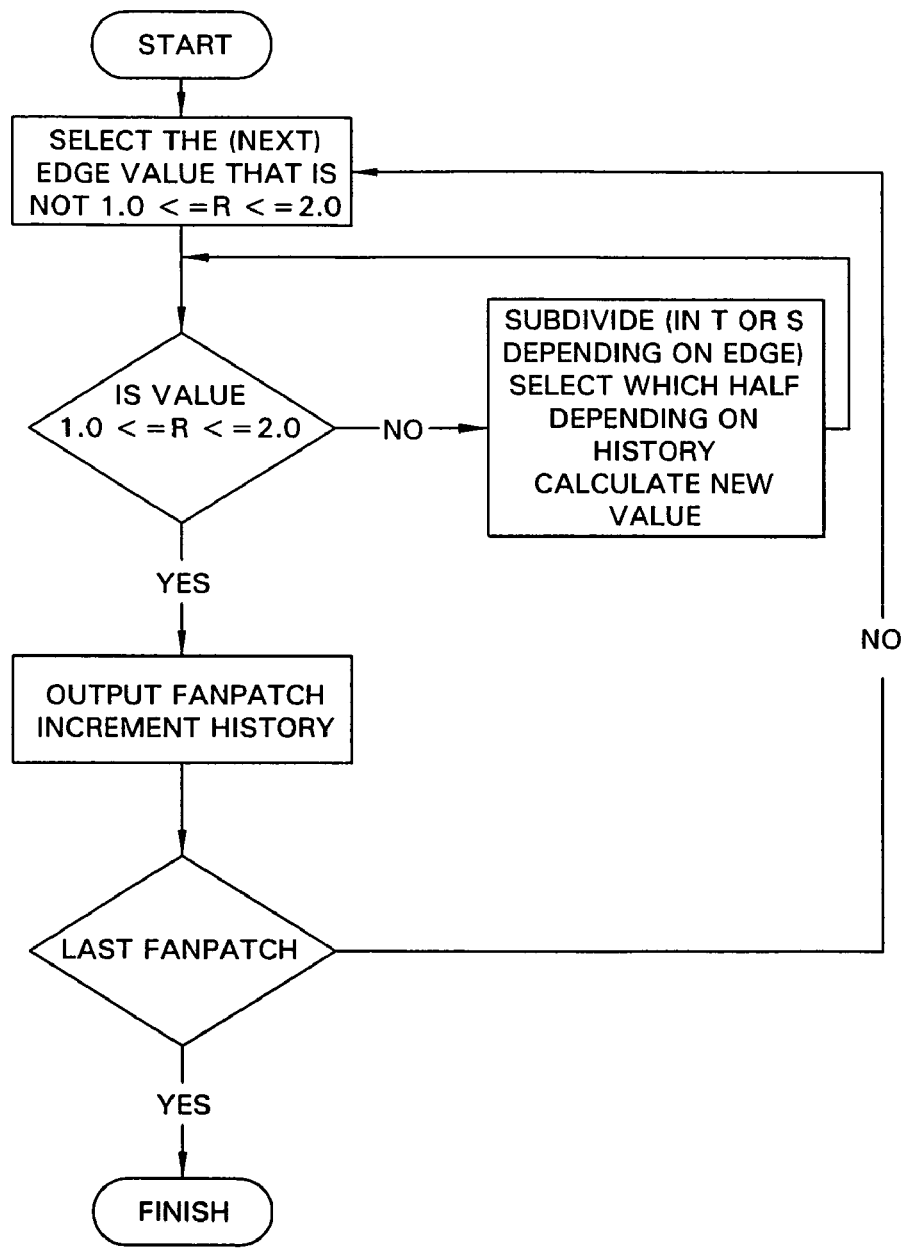
FIG. 15 is a flow chart showing operation of the control unit during fan patch processing.

As the example has a right edge value in the range 2.0 to 4.0 it will be seen that only one level of subdivision will be required to bring the right edge value within the range 1.0 to 2.0. The irregular patch processing steps are summarised in the flow diagram of FIG. 15. The edge values of the irregular patch are tested to determine which edge values are outside the range 1.0 to 2.0. Processing proceeds on an edge-wise basis. In the case of the example of FIGS. 13a and 14, only the right hand edge value is outside the range. This indicates that only subdivision in t is required. The control unit 22 sends the appropriate command signal to the subdivision unit 18 to divide the irregular patch in t. The edge values of the fan patches are computes as described above for the appropriate general form of subdivision. The top and bottom half subpatches returned by 18 define upper and lower fan patches which may be used to compute the additional vertices V23 and V24. The control unit 22 maintains a history of the fan patch generation to ensure the generation of all appropriate fan patches. In this case, after generation of a top half fan patch and a bottom half fan patch, all edge values are within the range 1.0 and 2.0 and no further subdivision to form fan patches is required.

The additional vertex V23 is obtained by calculating the centre right vertex of the upper fan patch in accordance with equation 2 described above. The additional vertex V24 is calculated by estimating the centre right vertex of the lower fan patch in accordance with equation 2 above.

None of the other vertices of the fan patches are required in the tessellation process. The irregular leaf polygon data is generated by combining the vertices generated by the normal subdivision process to form a leaf patch, the "first plurality of vertices'", and the additional vertices calculated from the fan patches, the "fan patch values'".

Background to Calculation of the Direction of the Vertex Surface Normals

The surface normal generation unit 24 takes the output of the subdivision unit 18 and calculates the surface normal associated with each vertex. (Note that in the preferred embodiment, the units 20 and 24 are separate but, in an alternative embodiment, they could share a number of calculations that they have in common.) The surface normal is used to indicate the direction that the surface being modelled is facing at the sample point and is required for subsequent lighting and texturing calculations. The direction processor 24 calculates the normal for each vertex of the leaf patch including any additional vertices calculated from irregular patches. To minimise the shading analog of polygon popping, the same linear interpolation method as described previously by equation 2, is also applied to the normals of interior vertices, i.e. the output normal may be a blend of the neighbouring vertices' normals and the 'correct' normal.

Note that, ideally, it is actually the final shading and texturing values that should be 'blended'. In the preferred embodiment this is not done due to constraints imposed by external graphics standards (e.g. Microsoft's DirectX). To one skilled in the art it should be apparent that the presented 'polygon popping reduction' method could easily be applied after the vertex shading is computed should these constraints be removed.

Figure 19:
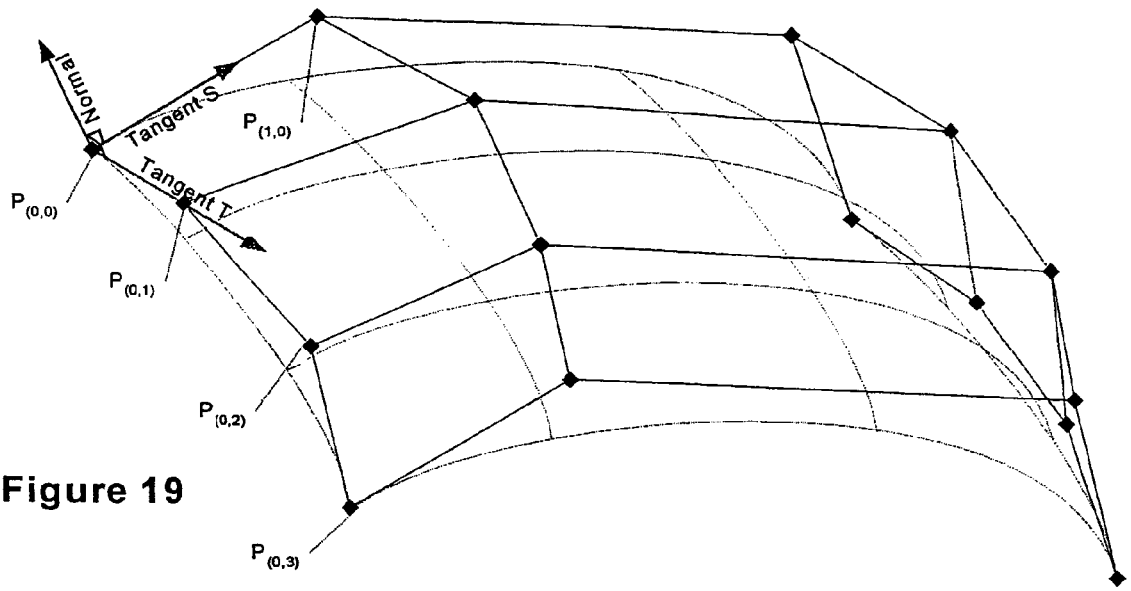
FIG. 19 illustrates one example of the behaviour of tangent vectors at the corners of a non-rational bicubic Bezier Patch.

As known in the prior art, computation of surface normals can be simpler for the four vertices located at the corners of non-rational Bezier patches. An example of this has been shown in FIG. 19. The invention adapts this principal for use with rational patches.

Figure 20:
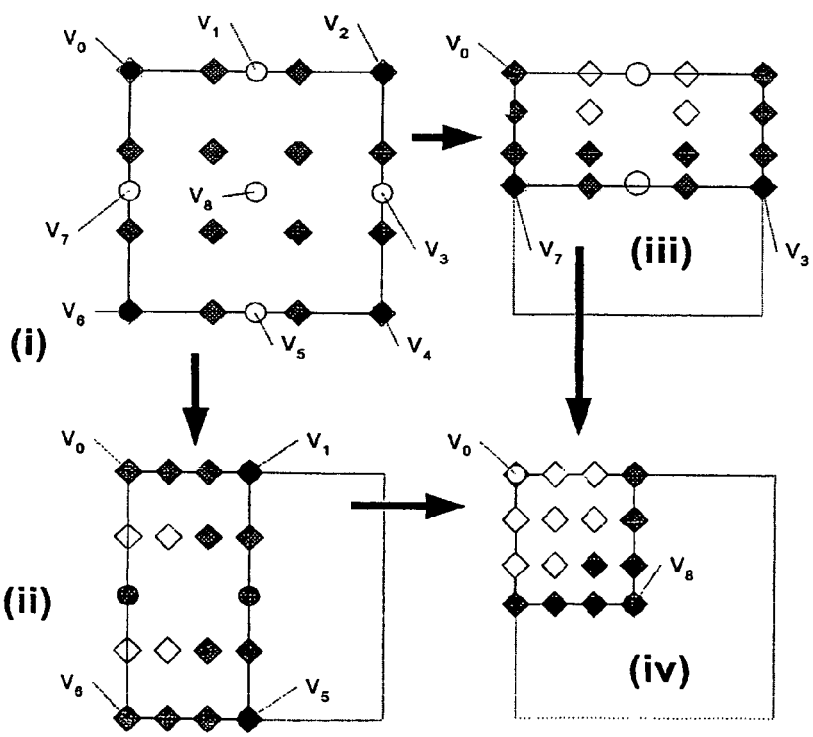
FIG. 20 shows the additional partial subdivision steps applied to a (regular) leaf patch to generate control points suitable for constructing the surface normals at the 9 "tessellation" vertices (i.e. those shown in FIG. 11)

Since only four of the points initially lie at the corners of a leaf patch, the invention performs additional 'partial' subdivisions of the leaf. This processing is shown in FIG. 20. In the case of the nine vertices of a regular leaf patch (the numbering of which is that used in FIG. 11), three additional partial subdivisions (one in S (20(iii)), one in T (20(ii)), and an additional subdivision (20(iv))) are sufficient to produce child sub-patches such that positions of V1, V3, V5, V7 and V8, are at the corners of at least one sub-patch. Note that not all control points of each sub-patch are needed to generate the vertex normals and in the preferred embodiment only the minimum required control points are calculated. In FIG. 20, the control points which are needed (either directly for computation of a corner normal or for generation of the required child patch's control points) are shown in grey or black, while those that aren't required are shown in white.

As stated, the invention computes the normals for rational Bezier patches in an efficient manner, the method and reasoning behind which will now be presented.

The position of a rational surface at parameter location (s,t) (s,t) is given by:

$$\overline{B}_{3D}(s, t) = \frac{\overline{B}_{xyz}(s, t)}{B_w(s, t)}$$

while the definition of the unit length tangent vector, at (0,0) in the direction (a,b) is defined by:

$$\hat{T}_{ab}(0, 0) = \lim_{e \to 0}\left(\frac{\overline{B}_{3D}(ea, eb) - \overline{B}_{3D}(0, 0)}{\|\overline{B}_{3D}(ea, eb) - \overline{B}_{3D}(0, 0)\|}\right)$$

Examining the "difference" terms in the expression we have . . .

$$\overline{B}_{3D}(ea, eb) - \overline{B}_{3D}(0, 0) = \frac{\overline{B}_{xyz}(ea, eb)}{w(ea, eb)} - \frac{\overline{B}_{xyz}(0, 0)}{w(0, 0)}$$

. . . which implies . . .

Since the scalar value w(ea,eb)w(0,0) is positive and non-zero, it can be applied to both top and bottom of the above limit equation giving:

$$\hat{T}_{ab}\left(0, 0\right) = \lim_{e \to 0}\left(\frac{\overline{B}_{xyz}(ea, eb) \cdot w(0, 0) - \overline{B}_{xyz}(0, 0) \cdot w(ea, eb)}{\|\overline{B}_{xyz}(ea, eb) \cdot w(0, 0) - \overline{B}_{xyz}(0, 0) \cdot w(ea, eb)\|}\right) \quad \text{eqn 3}$$

Restricting our attention to rational Bezier parametric surfaces and noting that the (0,0) (0,0) point of Bezier patch corresponds to the $\overline{P}_{00}$ control point, we thus need to examine the behaviour of . . .

$$\overline{B}_{xyz}(ea, eb).P_{00w} - \overline{P}_{00xyz}.w(ea, eb).$$

For convenience, we will define $$\overline{B}_{Delta}(ea, eb) = \overline{B}_{xyz}(ea, eb).P_{00w} - \overline{P}_{00xyz}.w(ea, eb).$$

In the preferred embodiment, the Bezier functions are bicubic. Extensions of this scheme to embodiments using surfaces of higher order should be straightforward to one skilled in the art.

We now express the bicubic homogenous Bezier surface (i.e. prior to the division of the x, y, and z components by the w component) at (ea, eb) in the matrix form to obtain:

It can thus be seen that this can be expressed as:

$$\begin{aligned}\overline{B}(ea, eb) = &([\,e^3a^3 \quad e^2a^2 \quad ea \quad 0\,] + [\,0 \quad 0 \quad 0 \quad 1\,])QPQ^T \\ &([\,e^3b^3 \quad e^2b^2 \quad eb \quad 0\,]^T + [\,0 \quad 0 \quad 0 \quad 1\,]^T) \\ = &[\,e^3a^3 \quad e^2a^2 \quad ea \quad 0\,]QPQ^T[\,e^3b^3 \quad e^2b^2 \quad eb \quad 0\,]^T + \\ &[\,0 \quad 0 \quad 0 \quad 1\,]QPQ^T[\,e^3b^3 \quad e^2b^2 \quad eb \quad 0\,]^T \\ &[\,e^3a^3 \quad e^2a^2 \quad ea \quad 0\,]QPQ^T[\,0 \quad 0 \quad 0 \quad 1\,]^T + \\ &[\,0 \quad 0 \quad 0 \quad 1\,]QPQ^T[\,0 \quad 0 \quad 0 \quad 1\,]^T\end{aligned}$$

Noting the particular properties of the Q matrix, this simplifies to $$\begin{aligned}\overline{B}(ea, eb) = &[\,e^3a^3 \quad e^2a^2 \quad ea \quad 0\,]QPQ^T[\,e^3b^3 \quad e^2b^2 \quad eb \quad 0\,]^T + \\ &[\,1 \quad 0 \quad 0 \quad 0\,]PQ^T[\,e^3b^3 \quad e^2b^2 \quad eb \quad 0\,]^T + \\ &[\,e^3a^3 \quad e^2a^2 \quad ea \quad 0\,]QP[\,1 \quad 0 \quad 0 \quad 0\,]^T + P_{00}\end{aligned}$$

which in turn reduces to . . .

$$\begin{aligned}\overline{B}(ea, eb) = &[\,e^3a^3 \quad e^2a^2 \quad ea \quad 0\,]QPQ^T[\,e^3b^3 \quad e^2b^2 \quad eb \quad 0\,]^T + \\ &P_{top-row}Q^T[\,e3b3 \quad e2b2 \quad eb \quad 0\,]T + \\ &[\,e^3a^3 \quad e^2a^2 \quad ea \quad 0\,]QP_{left-column} + P_{00}\end{aligned}$$

The invention's method computes up to three potential tangent candidates, these being the 'S', 'T', and 'diagonal' tangent candidates.

Derivation of a candidate tangent vector in the 'S' direction:

If we consider the case of producing a tangent vector in the 'S' direction, then equations 3 and 4 respectively reduce to:

$$\hat{T}_s(0, 0) = \lim_{e \to 0}\left(\frac{B_{Delta}(e, 0)}{\|B_{Delta}(e, 0)\|}\right)$$

and $$\overline{B}(e,0) = [\,e^3e^2e0\,]QP_{left-column} + P_{00}$$

Examining $\overline{B}_{Delta}(e,0)$ we find:

$$\overline{B}_{Delta}(e, 0) = \overline{B}_{xyz}(e, 0) \cdot P_{00w} - P_{00xyz} \cdot w(e, 0)$$
$$= ([\begin{array}{cccc} e^3 & e^2 & e & 0 \end{array}] Q P_{left-column_{xyz}} + P_{00xyz}) P_{00w} -$$
$$P_{00xyz}([\begin{array}{cccc} e^3 & e^2 & e & 0 \end{array}] Q P_{left-column_w} + P_{00w})$$
$$= [\begin{array}{cccc} e^3 & e^2 & e & 0 \end{array}] Q P_{left-column_{xyz}} \cdot P_{00w} -$$
$$P_{00xyz} [\begin{array}{cccc} e^3 & e^2 & e & 0 \end{array}] Q P_{left-column_w}$$

We now consider 3 cases:

1. $\hat{T}_s(0, 0) = \lim_{e \to 0} \left( \frac{\overline{B}_{Delta}(e, 0)}{\|\overline{B}_{Delta}(e, 0)\|} \right) = \lim_{e \to 0} \left( \frac{\frac{1}{e} \cdot \overline{B}_{Delta}(e, 0)}{\left\| \frac{1}{e} \cdot \overline{B}_{Delta}(e, 0) \right\|} \right)$ 2. $\hat{T}_s(0, 0) = \lim_{e \to 0} \left( \frac{\overline{B}_{Delta}(e, 0)}{\|\overline{B}_{Delta}(e, 0)\|} \right) = \lim_{e \to 0} \left( \frac{\frac{1}{e^2} \cdot \overline{B}_{Delta}(e, 0)}{\left\| \frac{1}{e^2} \cdot \overline{B}_{Delta}(e, 0) \right\|} \right)$ 3. $\hat{T}_s(0, 0) = \lim_{e \to} \left( \frac{\overline{B}_{Delta}(e, 0)}{\|\overline{B}_{Delta}(e, 0)\|} \right) = \lim_{e \to 0} \left( \frac{\frac{1}{e^3} \cdot \overline{B}_{Delta}(e, 0)}{\left\| \frac{1}{e^3} \cdot \overline{B}_{Delta}(e, 0) \right\|} \right)$ For each of the above cases, from calculus it is known that if the limits as e→0 of both the numerator and denominator exist (and the limit is non zero), then the limit of the entire expression exists).

Case 1: Starting with the numerator/denominator 'contents' we have $$\lim_{e \to 0} \frac{1}{e} \overline{B}_{Delta}(e, 0) = \lim_{e \to 0} [\begin{array}{cccc} e^2 & e & 1 & 0 \end{array}] Q \overline{P}_{left-column_{xyz}} \cdot P_{00w} -$$
$$\overline{P}_{00xyz} [\begin{array}{cccc} e^2 & e & 1 & 0 \end{array}] Q P_{left-column_w}$$
$$= [\begin{array}{cccc} 0 & 0 & 1 & 0 \end{array}] Q \overline{P}_{left-column_{xyz}} \cdot P_{00w} -$$
$$\overline{P}_{00xyz} [\begin{array}{cccc} 0 & 0 & 1 & 0 \end{array}] Q P_{left-column_w}$$
$$= [\begin{array}{cccc} -3 & 3 & 0 & 0 \end{array}] \overline{P}_{left-column_{xyz}} \cdot P_{00w} -$$
$$\overline{P}_{00xyz} [\begin{array}{cccc} -3 & 3 & 0 & 0 \end{array}] Q P_{left-column_w}$$
$$= 3((\overline{P}_{10_{xyz}} - \overline{P}_{00xyz}) \cdot P_{00w} - \overline{P}_{00xyz}(P_{10_w} - P_{00_w}))$$
$$= 3(\overline{P}_{10_{xyz}} P_{00w} - \overline{P}_{00xyz} P_{10_w})$$

The limit clearly exists and will be non-zero if and only if $\overline{P}10_{xyz}P_{00w} \neq P_{00xyz}P_{10w}$. If this condition holds then a tangent vector in the direction S is given by $Ts1 = \overline{P}10_{xyz}P_{00w} - \overline{P}_{00xyz}P_{10w}$. Note that the length of the vector is immaterial at this point.

Case 2: if the condition of case 1 is not met, (i.e. $\overline{P}10_{xyz}P_{00w} = P_{00xyz}P_{10w}$), then the limits of the second case are examined. This gives:

$$\lim_{e \to 0} \frac{1}{e^2} \overline{B}_{Delta}(e, 0) = \lim_{e \to 0} \frac{1}{e} (\overline{B}_{Delta}(e, 0))$$

Noting that . . .

$$\frac{1}{e} \overline{B}_{Delta}(e, 0) = [\begin{array}{cccc} e^2 & e & 1 & 0 \end{array}] Q \overline{P}_{left\_column_{xyz}} \cdot P_{00w} -$$
$$\overline{P}_{00xyz} [\begin{array}{cccc} e^2 & e & 1 & 0 \end{array}] Q P_{left\_column_w}$$
$$= [\begin{array}{cccc} e^2 & e & 0 & 0 \end{array}] Q \overline{P}_{left\_column_{xyz}} \cdot P_{00w} -$$
$$\overline{P}_{00xyz} [\begin{array}{cccc} e^2 & e & 0 & 0 \end{array}] Q P_{left\_column_w} +$$
$$[\begin{array}{cccc} 0 & 0 & 1 & 0 \end{array}] Q \overline{P}_{left\_column_{xyz}} \cdot P_{00w} -$$
$$\overline{P}_{00xyz} [\begin{array}{cccc} 0 & 0 & 1 & 0 \end{array}] Q P_{left\_column_w}$$

. . . we see that the second part of the sum is the same as the result from case 1, which have assumed to be zero. We thus get $$\lim_{e \to 0} \frac{1}{e^2} B_{Delta}(e, 0) = \lim_{e \to 0} \frac{1}{e} [\begin{array}{cccc} e^2 & e & 0 & 0 \end{array}] Q \overline{P}_{left\_column_{xyz}} \cdot P_{00w} -$$
$$\overline{P}_{00xyz} [\begin{array}{cccc} e^2 & e & 0 & 0 \end{array}] Q P_{left\_column_w}$$
$$= \lim_{e \to 0} \frac{1}{e} [\begin{array}{cccc} e & e & 0 & 0 \end{array}] Q \overline{P}_{left\_column_{xyz}} \cdot P_{00w} -$$
$$\overline{P}_{00xyz} [\begin{array}{cccc} e & e & 0 & 0 \end{array}] Q P_{left\_column_w}$$
$$= [\begin{array}{cccc} 0 & 1 & 0 & 0 \end{array}] Q \overline{P}_{left\_column_{xyz}} \cdot P_{00w} -$$
$$\overline{P}_{00xyz} [\begin{array}{cccc} 0 & 1 & 0 & 0 \end{array}] Q P_{left\_column_w}$$
$$= [\begin{array}{cccc} 3 & -6 & 3 & 0 \end{array}] \overline{P}_{left\_column_{xyz}} \cdot P_{00w} -$$
$$\overline{P}_{00xyz} [\begin{array}{cccc} 3 & -6 & 3 & 0 \end{array}] P_{left\_column_w}$$
$$= (3\overline{P}_{20_{xyz}} - 6\overline{P}_{10_{xyz}} + 3\overline{P}_{00_{xyz}}) P_{00w} -$$
$$\overline{P}_{00xyz} (3\overline{P}_{20_w} - 6\overline{P}_{10_{xyz}} + 3\overline{P}_{00_{xyz}})$$
$$= (3\overline{P}_{20_{xyz}} + 3\overline{P}_{00_{xyz}}) P_{00w} -$$
$$\overline{P}_{00xyz} (3\overline{P}_{20_w} + 3\overline{P}_{00_{xyz}}) -$$
$$6(\overline{P}_{10_{xyz}} P_{00w} - \overline{P}_{00xyz} \overline{P}_{10_w})$$

Again we have assumed $\overline{P}_{10_{xyz}} P_{00w} = \overline{P}_{00xyz} P_{10_w}$ and so this becomes $$= (3\overline{P}_{20_{xyz}} + 3\overline{P}_{00_{xyz}}) \cdot P_{00w} - \overline{P}_{00xyz} (3\overline{P}_{20_w} + 3\overline{P}_{00_w})$$
$$= 3(\overline{P}_{20_{xyz}} P_{00w} - \overline{P}_{00xyz} \overline{P}_{20_w})$$

Thus if the chosen conditions hold, there is a valid 'S' tangent $T_{s2} = \overline{P}20_{xyz}P_{00w} - \overline{P}_{00xyz}\overline{P}20_w$ if this is non-zero.

Case 3:

Should both cases 2 and 3 fail, then using a similar argument to these presented, an "S" may be computed from $T_{s3} = \overline{P}_{30_{xyz}} P_{00w} - \overline{P}_{00xyz} \overline{P}_{30_w}$ provided that is non-zero.

Derivation of a candidate tangent vector in the 'T' direction:

This follows exactly the same reasoning as for the "S" tangent, and so will not be discussed here.

Derivation of a candidate tangent vector in the 'diagonal' direction:

If the $T_{S\alpha}$ and $T_{T\beta}$ candidate tangent are linearly dependent then by themselves they are not suitable for generating the normal vector. In this case it is necessary to manufacture another tangent candidate, which will be referred to as the 'diagonal' tangent candidate.

For the purposes of the preferred embodiment, it is assumed that at least one of $T_{S\alpha}$ or $T_{T\beta}$ is non-zero—the first non-zero choice will be called $T_{NZ}$. Under these conditions, a 'diagonal' tangent vector candidate will be chosen to the $T_{diag} = \overline{P}_{11_{xyz}} P_{00w} - \overline{P}_{00xyz} P_{11_w}$. The mathematics behind this choice is somewhat more involved, and so will not be presented here.

Figure 21:
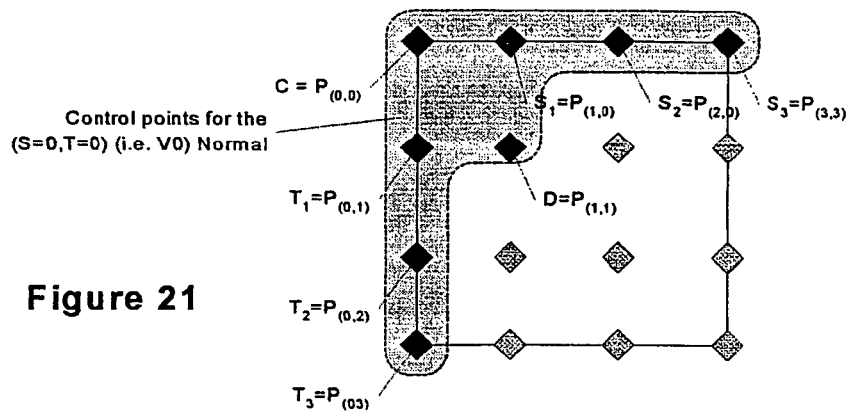
FIG. 21 shows the subset of control points of a rational bicubic Bezier patch used by the invention to generate the surface normal for a particular corner point of the patch.

It should now be clear that with the above method, up to eight control points may be required for the computation of a particular corner vertex's normal. FIG. 21 illustrates the set for the case of the V0 (i.e. (s,t)=(0,0)) corner vertex. Because the choice of control points will change depending on the vertex normal being calculated, a different nomenclature will be employed for the remainder of the discussion. The control points used for the calculation of a particular vertex normal will be called C, $S_1$, $S_2$, $S_3$, $T_1$, $T_2$, $T_3$, and D. As an example, the correspondence between this naming scheme and the required control vertices for vertex V0 is also shown in FIG. 21.

Preferred embodiment of "Surface Normal generation unit" The surface normal generation unit, 24 is now explained with reference to FIG. 22a.

The leaf patch's control points are supplied, 200, and for each of the V0, V2, V4, and V6 vertices the correct set of 8 control points (C, $S_1$, $S_2$, $S_3$, $T_1$, $T_2$, $T_3$, D) are selected, 201, and supplied in turn to the corner normal unit, 202. Note that only the X, Y, Z, and W components of the control points are required in the surface normal generation unit.

Unit 201 is a MUX that chooses which of the original leaf patch control points correspond to each of the four sets of 8 points. In the preferred embodiment, the four selections are as follows:

Vertex V0: This is shown in FIG. 21.

$C = P_{30}\{ = V2\}$   $D = P_{21}$
v2:  $S_1 = P_{31}$   $S_2 = P_{32}$   $S_3 = P_{33}$
     $T_1 = P_{20}$   $T_2 = P_{10}$   $T_3 = P_{00}$ $C = P_{33}\{ = V4\}$   $D = P_{22}$
v4:  $S_1 = P_{23}$   $S_2 = P_{13}$   $S_3 = P_{03}$   and
     $T_1 = P_{32}$   $T_2 = P_{31}$   $T_3 = P_{30}$ $C = P_{03}\{ = V6\}$   $D = P_{12}$
v6:  $S_1 = P_{02}$   $S_2 = P_{01}$   $S_3 = P_{00}$
     $T_1 = P_{13}$   $T_2 = P_{23}$   $T_3 = P_{33}$ It should be noted that, in the preferred embodiment, the orientation of the 'virtual' S, T, and diagonal tangent candidates rotates by 90° with each successive corner vertex. This is done to maintain a consistent orientation of the surface normal.

In an alternative embodiment, selection of the control points by mirroring of the existing axis directions could be used but this would require an additional flag to be supplied to unit '202' to indicate if the result of the cross products should be negated. Such a negation would have to be indicated for at least vertices V2 and V6. (Vertex V4 would need no negation as both axes would have been flipped).

Unit 203 performs a partial subdivision of the leaf patch in order to compute new control points suitable for the generation of surface normals for vertices V1 and V5. The set required has been illustrated in FIG. 20(ii). Unit 204 is another multiplexor which selects the required points for each of V1 and V5 respectively and supplied them to the corner normal unit, 202. The selection process is analogous to that of unit 201 and should be obvious to one skilled in the art given the previous description.

In a similar fashion, units 205 and 206 produce the two sets of control points needed for the normals of vertices V3 and V7 (see FIG. 20(iii)).

Units 207 and 208 produce the set of eight control points needed to generate the surface normal for V8. This set is illustrated in FIG. 20(iv). Note that the four control points shown on the right edge of FIG. 20(iv) can be obtained by a single subdivision of the right edge of FIG. 20(ii), while the bottom edge is computed from a single subdivision of the bottom edge of FIG. 20(iii). The control point corresponding to "D" can be obtained from either the second bottom row of FIG. 20(iii) or alternatively from the second right most column of 20(ii).

For performance reasons, a preferred embodiment overlaps the calculation of several vertex normals via a combination of multiple units and a pipelined architecture. In alternative embodiments, the level of parallelism could be varied as a cost/performance trade-off.

The "corner normal unit", 202, is now discussed with reference to FIG. 22b. Note that for clarity, this figure only describes the computation of a single normal. The eight chosen control points are input, 220. The C point and three S points are sent to the "S Candidate" computation unit, 221, C and three T points are sent to the "T Candidate" computation unit, 222, while C and D are sent to the "Diagonal Candidate" unit. The three computed tangent candidates, $T_S$, $T_T$, and $T_{Diag}$, are then input into 'candidate selection and normal calculation' unit, 224.

The function of 221 will now be described with reference to the flowchart in FIG. 23. Although not explicitly shown in this figure, the preferred embodiment uses a pipelined architecture to compute each of the products, such as $S_{1_{XYZ}} C_W$ or $S_{2_W} C_{XYZ}$, "simultaneously". Similarly, the comparison operations are also carried out in a pipelined fashion. At step 240, the first two products, $S_{1_{XYZ}} C_W$ and $C_{XYZ} S_{1_W}$ are compared. (Those familiar with floating point arithmetic will appreciate that equality tests are simpler than subtraction). If these products are not equal then the $T_S$ tangent vector is computed in step 241 by taking the difference of the two. If, on the other hand, the two products are equal, then the next pair of products, $S_{2XYZ} C_W$ and $C_{XYZ} S_{2_W}$ are compared, 242. If these differ, $T_S$ is set to be the difference of the pair, 243. Instead, if the products were identical, then the final pair of products, $S_{3_{XYZ}} C_W$ and $C_{XYZ} S_{3_W}$, are compared, 244, and if different, $T_S$ is computed, while if they are identical, then the tangent is marked as being zero.

In an alternative embodiment an additional 'optimisation' can be included to initially test if the w or 'weight' component values are identical before optionally performing the multiplication. This could potentially reduce the computation delay for cases where the patches are non-rational, i.e. where the w values are constant.

It should thus be noted that only one vector subtract unit is required and in the preferred embodiment, this is pipelined. In alternative embodiments, the subtract unit could also be shared with units 222 and 223.

Unit 222 is similar to that 221 except that it computes $T_T$, while unit 223 simply calculates $T_{Diag} = D_{XYZ} C_W - C_{XYZ} D_W$.

Unit 224 is now described with reference to FIG. 24. Tests 250 and 252 check for the special cases where either $T_S$ or $T_T$ may be a zero vector, and set in intermediate vector, $T_{NZ}$, to be either $-T_T$ (251) or $T_S$ (253) respectively. If both vectors are non-zero, then a candidate surface normal is produced in step 254 by taking the vector cross product of $T_S$ and $T_T$. The candidate normal is then compared against zero, 255. If it is not zero, then it is used as the surface normal, 256. If it is zero, then the intermediate vector is set in step 253.

If the intermediate vector was required, then the alternative normal calculation is employed, 257. This computes the cross product of the intermediate vector and the diagonal tangent candidate. Note that in step 251, $T_{NZ}$ was sent to be the negative of $T_T$. This is done to maintain consistency of the normal orientation. It should be appreciated that negation of floating point values is trivial.

As stated earlier, the normals thus calculated for vertices V1, V3, V5, V7, and V8 represent those at the maximum fractional subdivision level within the leaf patch. For the smaller fractional levels, the same blending process used to eliminate polygon popping is also applied to produce the final normal vector results. Similarly, the calculation of normals for irregular leaf patches must undergo extra levels of subdivision akin to that previously described.

It should thus be appreciated that the invention computes the surface normals for rational Bezier surfaces without requiring expensive division operations. This is a significant saving. With the preferred embodiment, the normals that are output are not unit vectors—with the preferred embodiment it is assumed that the subsequent shading and transformation units, which are not described in the document, will be capable of performing this simple task if required.

Returning to FIG. 6, the final stage of the pipelined tessellation process is performed in the output buffer 26. The input buffer 12 took the control point grouped data and regrouped the data by element. The output buffer 26 is required to perform the reverse task of grouping the data from the calculation stages by vertex. The output buffer 26 takes the vertices calculated by the weighting processor 20 and the normals calculated by the surface normal processor 24, groups together the data for each element by vertex and outputs it for subsequent use in the transformation, lighting, texturing and rasterization of the image for display.

It should be noted that the features described by reference to particular figures and at different points of the description may be used in combinations other than those particularly described or shown. All such modifications are encompassed within the scope of the invention as set forth in the following claims.

With respect to the above description, it is to be realized that equivalent apparatus and methods are deemed readily apparent to one skilled in the art, and all equivalent apparatus and methods to those illustrated in the drawings and described in the specification are intended to be encompassed by the present invention. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

For example, alternative patterns of tessellating triangles are considered to fall within the scope of the invention.

The invention claimed is:

1. A 3-d graphics system comprising an apparatus for determining a surface normal vector for a vertex of a surface patch used in modelling of an object to be shaded by the system, the apparatus comprising:
   means for deriving the locations of control points required for derivation of a surface normal for a vertex;
   means for deriving a set of three candidate tangent vectors at a vertex from the control point locations;
   means for selecting two tangent vectors from the candidate tangent vectors; and
   means for deriving a surface normal from the selected tangent vectors.

2. A 3-d graphics system according to claim 1, wherein the means for deriving a set of three candidate tangent vectors further comprises:
   means for determining a candidate tangent vector $T_S$ in the S direction;
   means for determining a candidate tangent vector $T_T$ in the T direction; and
   means for determining a candidate tangent vector $T_D$ in the diagonal direction.

3. A 3-d graphics system according to claim 2, wherein the means for selecting two tangent vectors from the candidate tangent vectors is adapted to:
   select tangent vectors $T_S$ and $T_T$ when tangent vectors $T_S$ and $T_T$ are non-zero and linearly independent;
   select tangent vectors $T_S$ and $T_D$ when tangent vector $T_S$ is non-zero and tangent vector $T_T$ is zero;
   select tangent vectors $T_T$ and $T_D$ when tangent vector $T_T$ is non-zero and tangent vector $T_S$ is zero.

4. A 3-d graphics system according to claim 3, wherein the means for deriving a surface normal from the selected tangent vectors is adapted to:
   calculate $N=(-T_T) \times T_D$, when $T_S=0$, and output N as the surface normal;
   calculate $N=T_S \times T_D$, when $T_T=0$, and output N as the surface normal; and
   calculate $N=T_S \times T_T$, when $T_S$ and $T_T$ are nonzero, and output N as the surface normal when N is nonzero, otherwise when N=0 calculate $N'=T_S \times T_D$ and output N' as the surface normal.

5. A 3-d graphics system according to claim 2, wherein the means for estimating a candidate tangent vector $T_S$ in the S direction is adapted to:
   (a) estimate $T_S$ as being equal to $T_{S1}$, where $T_{S1} = P_{10xyz} P_{00w} - P_{00xyz} P_{10w}$ if $P_{10xyz} P_{00w}$ is not equal to $P_{00xyz} P_{10w}$; or
   (b) estimate $T_S$ as being equal to $T_{S2}$, where $T_{S2} = P_{20xyz} P_{00w} - P_{00xyz} P_{20w}$ if $P_{20xyz} P_{00w}$ is not equal to $P_{00xyz} P_{20w}$; or
   (c) estimate $T_S$ as being equal to $T_{S3}$, where $T_{S3} = P_{30xyz} P_{00w} - P_{00xyz} P_{30w}$ if $P_{30xyz} P_{00w}$ is not equal to $P_{00xyz} P_{30w}$.

6. A 3-d graphics system according to claim 2, wherein the means for estimating a candidate tangent vector $T_T$ in the T direction is adapted to:
   (a) estimate $T_T$ as being equal to $T_{T1}$, where $T_{T1} = P_{01xyz} P_{00w} - P_{00xyz} P_{01w}$ if $P_{01xyz} P_{00w}$ is not equal to $P_{00xyz} P_{01w}$; or
   (b) estimate $T_T$ as being equal to $T_{T2}$, where $T_{T2} = P_{02xyz} P_{00w} - P_{00xyz} P_{02w}$ if $P_{02xyz} P_{00w}$ is not equal to $P_{00xyz} P_{02w}$; or (C) estimate $T_T$ as being equal to $T_{T3}$, where $$T_{T3}=P_{03xyz}P_{00w}-P_{00xyz}P_{03w}$$

if $P_{03xyz}P_{00w}$ is not equal to $P_{00xyz}P_{03w}$.

7. A 3-d graphics system according to claim 2, wherein the means for estimating a candidate tangent vector $T_D$ in the diagonal direction is adapted to estimate $T_D$ according to the formula $T_D=P_{11xyz}P_{00w}-P_{00xyz}P_{11w}$.

8. A 3-d graphics system according to claim 1, wherein the means for deriving a surface normal from the selected tangent vectors is adapted to test whether the derived surface normal is zero, and when the derived surface normal is zero to:
 cause an alternative two tangent vectors to be selected; and
 use the alternative two tangent vectors to derive an alternative surface normal, and output the alternative surface normal as the vertex surface normal.

9. A method for determining a surface normal vector for a vertex of a surface patch used in modelling of an object to be shaded in a 3-d graphics system, the method comprising the steps of:
 deriving the locations of control points required for determining a surface normal for a vertex;
 deriving a set of three candidate tangent vectors at a vertex from the control point data;
 selecting two tangent vectors from the set of candidate tangent vectors; deriving a surface normal from the selected tangent vectors; and rasterizing the image for display.

10. A method for determining a surface normal for a vertex according to claim 9, wherein:
 the step of deriving the locations of control points comprises the sub-steps of:
  (a) deriving a first subset of control points along one edge of the patch adjacent to a chosen corner,
  (b) deriving a second subset of control points along the other edge of the patch adjacent to the chosen corner, and
  (c) deriving a third subset of control points consisting of a control point off-set from the corner of the patch in each of a set of chosen parameter dimensions; and wherein
 the step of deriving three candidate tangent vectors comprises deriving first, second and third candidate tangent vectors from each respective subset of control points and the corner points.

11. A method according to claim 10 wherein a candidate tangent vector at a corner control point is derived by repeatedly selecting control points from a given subset of control points in any given order; and
 deriving a first weighted vector by multiplying a chosen control point's components by a weighting component of the corner control point;
 deriving a second weighting vector by multiplying the components of the corner control point by a weighting vector of a chosen control point;
 deriving a difference vector between a first and second weighted vectors; and
 using the difference vector as a candidate tangent vector if it is a non-zero, and otherwise progressing to the next control point of the subset.

12. A method for determining a surface normal vector for a vertex according to claim 9, wherein the step of deriving three candidate tangent vectors at a vertex further comprises the steps of:
 estimating a candidate tangent vector $T_S$ in the S direction;
 estimating a candidate tangent vector $T_T$ in the T direction; and
 estimating a candidate tangent vector $T_D$ in the diagonal direction.

13. A method for determining a surface normal vector for a vertex according to claim 12, wherein the step of selecting two tangent vectors from the candidate tangent vectors comprises:
 selecting tangent vectors $T_S$ and $T_T$ when tangent vectors $T_S$ and $T_T$ are non-zero;
 selecting tangent vectors $T_S$ and $T_D$ when tangent vector $T_S$ is non-zero and tangent vector $T_T$ is zero;
 selecting tangent vectors $T_T$ and $T_D$ when tangent vector $T_T$ is non-zero and tangent vector $T_S$ is zero.

14. A method for determining a surface normal vector for a vertex according to claim 13, wherein the step of deriving a surface normal from the selected tangent vectors comprises:
 calculating $N=(-T_T)\times T_D$, when $T_S=0$, and outputting N as the surface normal;
 calculating $N=T_S\times T_D$, when $T_T=0$, and outputting N as the surface normal; and
 calculating $N=T_S\times T_T$, when $T_S$ and $T_T$ are non-zero, and output N as the surface normal when N is non-zero, otherwise when N=0 calculating $N'=T_S\times T_D$ and outputting N' as the surface normal.

15. A method for determining a surface normal vector for a vertex according to claim 12, wherein the step of estimating a candidate tangent vector $T_S$ in the S direction comprises:
 (a) determining an estimate for $T_S$, where $$T_{S1}=P_{10xyz}P_{00w}-P_{00xyz}P_{10w}$$

if $P_{10xyz}P_{00w}$ is not equal to $P_{00xyz}P_{10w}$; or
 (b) determining an estimate for $T_S$, where $$T_{S2}=P_{20xyz}P_{00w}-P_{00xyz}P_{20w}$$

if $P_{20xyz}P_{00w}$ is not equal to $P_{00xyz}P_{20w}$; or
 (c) determining an estimate for $T_S$, where $$T_{S3}=P_{30xyz}P_{00w}-P_{00xyz}P_{30w}$$

if $P_{30xyz}P_{00w}$ is not equal to $P_{00xyz}P_{30w}$.

16. A method for determining a surface normal vector for a vertex according to claim 12, wherein the step of estimating a candidate tangent vector $T_T$ in the T direction comprises:
 (a) determining an estimate for $T_T$, where $$T_{T1}=P_{01xyz}P_{00w}-P_{00xyz}P_{01w}$$

if $P_{01xyz}P_{00w}$ is not equal to $P_{00xyz}P_{01w}$; or
 (b) determining an estimate for $T_T$, where $$T_{T2}=P_{02xyz}P_{00w}-P_{00xyz}P_{02w}$$

if $P_{02xyz}P_{00w}$ is not equal to $P_{00xyz}P_{02w}$; or
 (c) determining an estimate for $T_T$, where $$T_{T3}=P_{03xyz}P_{00w}-P_{00xyz}P_{03w}$$

if $P_{03xyz}P_{00w}$ is not equal to $P_{00xyz}P_{03w}$.

17. A method for determining a surface normal vector for a vertex according to claim 12, wherein the step of estimating a candidate tangent vector $T_D$ in the diagonal direction comprises determining the estimate $T_D=P_{11xyz}P_{00w}-P_{00xyz}P_{11w}$.

18. A method of determining a surface normal for a vertex according to claim 9, wherein when the derived surface normal is zero an alternative pair of tangent vectors is selected and an alternative surface normal is derived.

19. A method for determining surface normal vectors for "tessellation" vertices of a surface patch used in modelling of an object to be shaded in a 3-d graphic system, the method comprising the steps of:

deriving surface normals for four corner vertices of the patch, with the surface normal for each corner vertex being derived by the sub-steps of:
(a) deriving the locations of control points required for determining a surface normal for the vertex,
(b) deriving a set of three candidate tangent vectors at the vertex from the control point data,
(c) selecting two tangent vectors from the set of candidate tangent vectors, and
(d) deriving a surface normal from the selected tangent vectors;

generating additional control points required to derive surface normals for non-corner tessellation vertices by the sub-steps of:
(a) partially subdividing the patch in a first parameter dimension to derive a first subset of control points of a first sub-patch,
(b) partially subdividing the patch in a second parameter dimension to derive a second subset of control points of a second sub-patch, and
(c) performing a third partial subdivision to derive a third subset of control points from the first and second subsets of control points; and using the first subset of control points to derive surface normals for two mid-point tessellation vertices, with the surface normal for each midpoint tessellation vertex being derived by the sub-steps of:
(a) deriving the locations of control points required for determining a surface normal for the vertex,
(b) deriving a set of three candidate tangent vectors at the vertex from the control point data,
(c) selecting two tangent vectors from the set of candidate tangent vectors, and
(d) deriving a surface normal from the selected tangent vectors;

using the second subset of control points to derive surface normals for the remaining two midpoint tessellation vertices, with the surface normal for each remaining mid-point tessellation vertex being derived by the sub-steps of:
(a) deriving the locations of control points required for determining a surface normal for the vertex,
(b) deriving a set of three candidate tangent vectors at the vertex from the control point data,
(c) selecting two tangent vectors from the set of candidate tangent vectors, and
(d) deriving a surface normal from the selected tangent vectors;

using the third subset of control points to derive a surface normal for a tessellation vertex at the centre of the patch, with the surface normal for the tessellation vertex at the center of the patch being derived by the sub-steps of:
(a) deriving the locations of control points required for determining a surface normal for the vertex,
(b) deriving a set of three candidate tangent vectors at the vertex from the control point data,
(c) selecting two tangent vectors from the set of candidate tangent vectors, and
(d) deriving a surface normal from the selected tangent vectors; and rasterizing the image for display.

* * * * *